United States Patent
Roweth et al.

(10) Patent No.: US 12,457,189 B1
(45) Date of Patent: Oct. 28, 2025

(54) NETWORK ADDRESS TRANSLATION

(71) Applicant: Hewlett Packard Enterprise Development LP, Spring, TX (US)

(72) Inventors: Duncan Roweth, Bristol (GB); Keith D. Underwood, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 82 days.

(21) Appl. No.: 18/647,337

(22) Filed: Apr. 26, 2024

(51) Int. Cl.
*H04L 61/2557* (2022.01)
*H04L 61/256* (2022.01)

(52) U.S. Cl.
CPC ........ *H04L 61/2557* (2013.01); *H04L 61/256* (2013.01)

(58) Field of Classification Search
None
See application file for complete search history.

(56) References Cited

U.S. PATENT DOCUMENTS

| | | | | |
|---|---|---|---|---|
| 2004/0049774 A1* | 3/2004 | Boyd | ................... | G06F 11/2097 714/E11.078 |
| 2005/0138242 A1* | 6/2005 | Pope | ....................... | G06F 9/544 710/48 |
| 2010/0124220 A1* | 5/2010 | Morris | ................ | H04L 61/4511 370/389 |
| 2015/0195196 A1* | 7/2015 | Patel | .................... | H04L 61/4511 370/392 |
| 2016/0330117 A1* | 11/2016 | Thirumurthi | ........... | H04L 45/74 |
| 2017/0331738 A1* | 11/2017 | Avital | ................. | H04L 61/4511 |
| 2021/0326270 A1* | 10/2021 | Zou | ........................ | G06F 3/0604 |
| 2022/0021646 A1* | 1/2022 | Joshi | ................... | H04L 67/1001 |
| 2023/0121096 A1* | 4/2023 | Johnsen | ................ | H04L 61/103 370/392 |
| 2023/0385094 A1* | 11/2023 | Markuze | ................ | G06F 13/404 |
| 2025/0126062 A1* | 4/2025 | Mathew | ................. | H04L 45/00 |

FOREIGN PATENT DOCUMENTS

WO WO-02089384 A2 * 11/2002 ............. H04L 45/38

* cited by examiner

*Primary Examiner* — Phyllis A Book
(74) *Attorney, Agent, or Firm* — Slater Matsil, LLP

(57) ABSTRACT

In certain implementations, a method includes receiving, by a network interface controller (NIC), a request for inter-process communication associated with a sending process of a distributed application. The request includes a logical network address for a destination process of the distributed application. The method includes executing, by the NIC, a network address translation process to translate the logical network address for the destination process to a translated network address for the destination process. The network address translation process includes executing, using a first portion of the logical network address, a lookup of a network address translation table to determine a first address; determining a translation modifier by executing a translation algorithm using a second portion of the logical network address; and determining the translated network address using the first address and the translation modifier. The method includes processing, by the NIC, a first message using the translated network address.

20 Claims, 9 Drawing Sheets

NETWORK ADDRESS TRANSLATION

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

In networked computer systems, compute nodes may send messages to one another for various reasons. For example, in parallel computing applications, processes may send messages to one another. As a more particular example, in a high performance computing (HPC) system, a process executing on a source compute node may send a message to a process executing on a destination compute node via a communication network, such as a high-speed interconnect or other suitable type of communication network. In a high-speed network messages may be created in user space. Messages may be sent from a sending process to a receiving process to share data or for other suitable purposes. The messages may be sent using a variety of message passing models (e.g., libraries of functions), such as message passing interface (MPI), OpenSHMEM, or NVIDIA Collective Communications Library (NCCL), others. Each process may reside in its own address space, usually in user space memory.

BRIEF DESCRIPTION OF THE DRAWINGS

For a more complete understanding of this disclosure, and advantages thereof, reference is now made to the following descriptions taken in conjunction with the accompanying drawings, in which.

DETAILED DESCRIPTION

Figure 1:
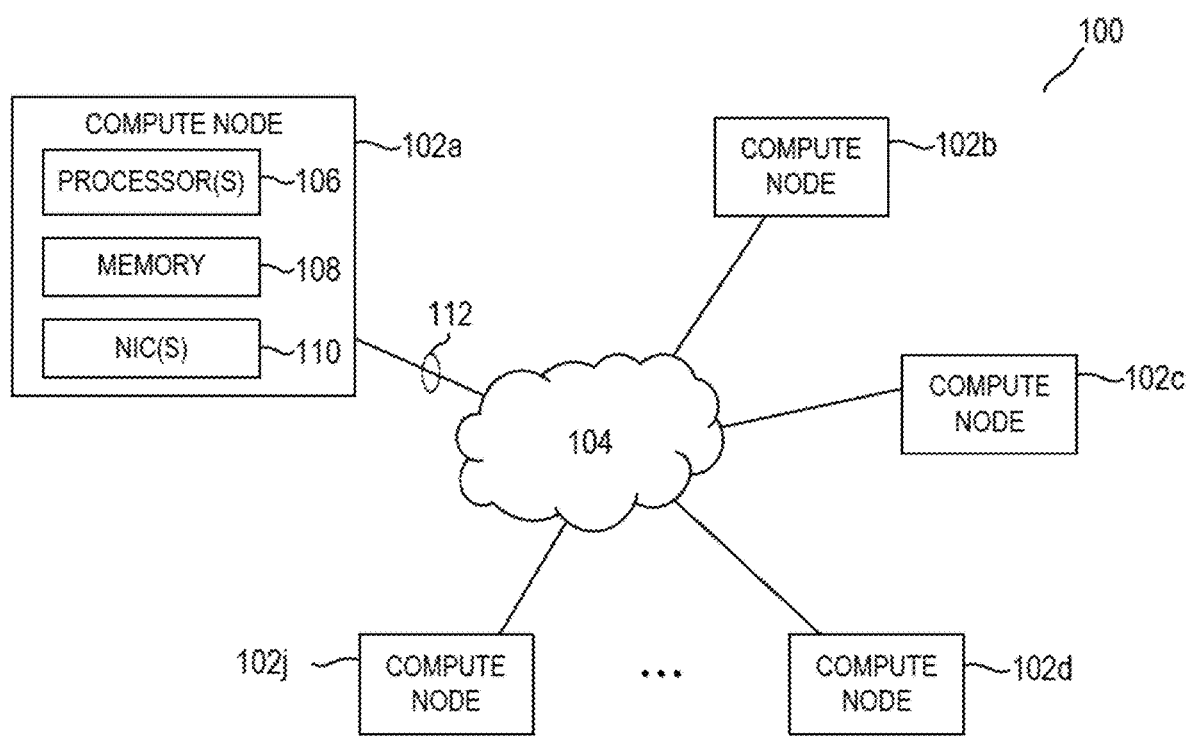
FIG. 1 illustrates an example system for network address translation, according to certain implementations.

Messages may be addressed to a destination process using a logical network address, which in some implementations may be a logical network identifier (LNID). The logical network address for a destination process may include a logical endpoint address, which may logically identify the compute node on which the destination process is executing (and possibly even more precisely a particular network interface controller (NIC) of the compute node on which the destination process is executing), and a logical process ID (PID), which may logically identify the destination process. To facilitate communication of the message over a communication network between the sending process and the destination process, it may be appropriate to perform a network address translation. For example, the network address translation may include translating the logical network address to a physical network address (e.g., in the case of Layer-2 communications) or to an Internet Protocol (IP) address (e.g., in the case of Layer-3 communications).

Performing this network address translation in software may involve a table lookup. The physical network addresses used by an executing application likely do not follow a simple pattern, meaning that table lookup is appropriate. Due to the sheer volume of messages and potential addresses, this table lookup generally will miss in the cache resulting in a performance penalty. In certain computing environments, a system may include 100,000 endpoints or more. Using tables of an adequate size for an environment with many endpoints and/or a high message volume/rate is wasteful when most systems may be much smaller than this. Additionally, allowing untrusted software to send messages directly to the physical endpoint potentially presents a security risk.

These problems may increase as application size increases, which may increase the number of processes and their associated distribution, as well as the number of messages being exchanged. Additionally or alternatively, these problems may increase as message rates increase. In certain industry roadmaps, both application size and message rates are expected to increase, which may accelerate these problems. As just one particular example, in certain implementations of an HPC environment, messages may be generated at a rate of about a billion or more per second (e.g., 1 per nanosecond or one per clock tick of the CPU). Imposing a network address translation task associated with that message load on the CPU may limit, potentially significantly, performance and divert CPU resources from software execution and other tasks.

Certain implementations of this disclosure provide techniques for efficient network address translation that move the network address translation process from application software (e.g. user space) to hardware (e.g., to a control plane), and in particular, to a network interface controller (NIC). Certain implementations provide a multi-part translation process that combines performing a network address translation table lookup using a first portion of a logical network address with using a translation algorithm to process a second portion of the logical network address. The network address translation table lookup may include using the first portion of a logical network address for a destination process to identify a base translation address. Using the translation algorithm to process the second portion of the logical network address for the destination process may generate a translation modifier. In certain implementations, the translation modifier may be an offset or a shift amount, which can be used in combination with the base translation address to determine the translated network address.

For a given translation algorithm that uses an offset/shift amount, the particular offset/shift amount depends on the second portion of the logical network address. The potential number of offsets/shift amounts that can be determined using a particular translation algorithm depends on the algorithm, which itself depends on the physical structure of the system and the associated communication network, including the network locations of the compute nodes of the system. The algorithm exploits a regular pattern in the physical addresses of the network endpoints for particular computing environment. Additionally, the potential number of offsets/shift amounts determinable using the algorithm dictates the number of addresses that can be determined from this base translation address of this single table lookup.

Certain implementations reduce a size of a network address translation table stored on the NIC by allowing a table with N entries to be usable to determine N×M addresses, where N and M are positive integers that may have the same or different values. The product of N×M may have a value greater than N. In other words, N×M addresses may be represented by a table having only N entries. This may vastly extend table size (and hence the number of represented addresses) while minimizing storage associated with storing the table. For example, N may be the number of rows in the network address translation table assigned to a particular computing environment, with each row corresponding to a base translation address, and M may be the number of offsets/shifts that can be determined for each of those base translation addresses using the algorithm.

Certain implementations of this disclosure move a network address translation process from application software that may operate in a user space to hardware, such as from a user space to a NIC. Moving the network address translation process to hardware may provide one or more advantages. For example, moving the network address translation process to hardware may reduce a burden on the CPU (e.g., CPU loading in high message rate scenarios) to process network address translations, freeing the CPU to perform other tasks and thereby increasing performance. As another example, moving the network address translation process to hardware (e.g., to the control plane, which is a trusted area of the system that includes memory for network address translation tables) may increase security by reducing reliance on relatively insecure software (e.g., relative to hardware). As another example, performing a network address translation in hardware may reduce or eliminate cache misses that may be incurred when performing network address translation using software. Certain implementations make high speed networking more efficient and/or more secure. Certain implementations may be able to scale to any system size. Certain implementations may be extended to cover both Layer-2 and Layer-3 addressing. Certain implementations are compatible with existing or future standard network application programming interfaces, such as libfabric, kfabric, Portals, and the Ultra Ethernet Consortium (UEC) transport protocol, allowing the solution to be used with little or no changes in higher levels of software.

Turning to the figures, FIG. 1 illustrates an example system 100 for network address translation, according to certain implementations. System 100 may include one or more computer systems at one or more locations. System 100 may be implemented using any suitable combination of hardware, firmware, and software. In the illustrated example, system 100 includes multiple compute nodes, including compute node 102a, compute node 102b, compute node 102c, compute node 102d, and through compute node 102j (j representing any suitable integer greater than 4 in this example), which may be referred to generally as compute nodes 102. System 100 may include any suitable number of compute nodes 102. Compute nodes 102 are communicatively coupled via communication network 104. System 100 may implement any computing environment capable of parallel execution of computing processes, such as processes of a distributed application. In certain implementations, system 100 is or includes an HPC computing environment or a computing environment designed for applications in artificial intelligence, as just a couple of examples.

Each compute node 102 may include any appropriate input devices, output devices, mass storage media, processors, memory, or other suitable components for receiving, processing, storing, and communicating data. For example, each compute node may include a server, a rack-mounted server, a blade server, a server pool, personal computer, workstation, network computer, kiosk, wireless data port, portable digital assistant, one or more IP telephones, one or more cellular/smart phones, one or more processors within these or other devices, or any other suitable processing device. For example, compute nodes 102 may be bare metal machines that are adapted to host cloud components (e.g., virtual machines, containers, etc.). Although system 100 includes a particular number of compute nodes 102, system 100 may include any suitable number of compute nodes 102.

Communication network 104 facilitates wireless and/or or wired communication. Communication network 104 may communicate, for example, Ethernet packets/frames, IP packets, Frame Relay frames, ATM cells, voice, video, data, and other suitable information between network addresses. Communication network 104 may include any suitable combination of one or more local area networks (LANs), radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global computer network known as the Internet, and/or any other communication system or systems at one or more locations, any of which may be any suitable combination of wireless and wired. Communication network 104 may include controllers, access points, switches, routers, or the like for forwarding traffic between compute nodes 102. In certain implementations, at least a portion of communication network 104 is a high-speed interconnect, such as one or more Ethernet networks, one or more INFINIBAND networks, one or more COMPUTE EXPRESS LINK (CXL) networks, and/or one or more proprietary networks (alone or in combination).

In some implementations, at least a portion of communication network 104 is a high-speed interconnect (e.g., one or more Ethernet networks, one or more INFINIBAND networks, and/or one or more CXL networks), and some or all of compute nodes 102 may be communicatively coupled via the high-speed interconnect. In a particular example of such an implementation, some or all of the compute nodes 102 coupled via the high-speed interconnect may form one or more clusters. In some implementations, at least a portion of communication network 104 is an Ethernet or other similar network, and some or all of compute nodes 102 may be communicatively coupled via the Ethernet network. In a particular example of such an implementation, some or all of the compute nodes 102 may communicate with one another via an Ethernet connection. Of course, this disclosure contemplates using these example implementations in combination. In a particular example of such an implementation, some or all of the compute nodes 102 may be communicatively coupled to each other via a high-speed interconnect to form one or more clusters, and the different clusters may communicate with each other via an Ethernet connection.

In the illustrated example, compute node 102a may include one or more processors 106, memory 108, and one or more NICs 110, some of which may be referred to throughout the remainder of this disclosure in the singular for simplicity. Compute node 102a may be implemented using any suitable combination of hardware, firmware, and software. Other compute nodes (e.g., compute nodes 102b through 102*m*) may be configured similarly or differently than compute node 102*a*, as may be appropriate for a given implementation.

Processors 106 may include one or more programmable logic devices, microprocessors, controllers, or any other suitable computing devices or resources or any combination of the preceding. Each processor 106 may include one or more processing cores. Processor 106 may include any suitable number of processors, or multiple processors may collectively form a single processor 106. Processors 106 may work, either alone or with other components of system 100, to provide a portion or all of the functionality of compute node 1. Memory 108 may take the form of volatile or non-volatile local or remote devices capable of storing information, including, without limitation, magnetic media, optical media, random access memory (RAM), read-only memory (ROM), removable media, or any other suitable memory device.

A NIC 110 may be a circuit, a card, and/or other suitable processing device that handles transmission and receipt of messages 112, including performing an associated network address translation, as described below. For example, a NIC 110 may be an input and/or output component configured to provide an interface between a compute node 102 and one or more other compute nodes via communication network 104. In certain implementations, a NIC 110 is used to receive and/or transmit messages 112.

A message 112 may include a payload (e.g., data intended for consumption by an entity receiving the message 112) within any number of headers and/or trailers, which may be fields of information intended to allow receiving entities to perform various actions to propagate the message 112 towards a destination (e.g., another device, an application receiver, etc.). Such fields of information may include, but are not limited to, various items of information related to protocols being used for implementing data transmission (e.g., media access control (MAC), IP, transmission control protocol (TCP), user datagram protocol (UDP), address resolution protocol (ARP), hypertext transfer protocol (HTTP), file transfer protocol (FTP), virtual extensible local area network (VXLAN) protocol, multiprotocol label switching (MPLS) segment routing (SR) protocols, etc.), addresses and/or labels related to such protocols (e.g., IP addresses, MAC addresses, label stacks, etc.), fields related to error identification and/or correction, etc. NIC 110 may be configured with interfaces of any type for receiving and/or transmitting messages 112, such as, for example, wireless interfaces, wired interfaces, etc.

An application may be executed using one or more compute nodes 102. Compute nodes 102 may execute processing tasks, such as portions of a distributed application for execution in a potentially parallel manner. For example, these processing tasks may be assigned to compute nodes 102 (e.g., by a scheduler/orchestrator) as execution flows that involve compute nodes 102 executing computer code, potentially in portions. To that end, compute nodes 102 may execute one or more processes of the application, working together to execute the application.

In association with executing the one or more processes, such as during runtime, compute nodes 102 may communicate by sending messages 112 to one other, including, potentially, control messages and/or data. Messages 112 also may be referred to as inter-process communications, as messages 112 may be sent from one process to another process. For example, some execution flows may involve multiple compute nodes 102 and potentially an exchange of messages 112 by the compute nodes 102. In certain implementations, any of compute nodes 102 can be a sender of messages 112 and/or a receiver of messages 112, though this disclosure contemplates one or more of compute nodes 102 lacking the ability to send/receive messages 112, if appropriate.

Messages 112 may be exchanged between compute nodes 102 using a messaging system, such as MPI, OpenSHMEM, NCCL, or another suitable messaging system. The applications may view their allocated processes of system 100 (e.g., of compute nodes 102) as a contiguous range of logical identifiers (e.g., 0 . . . . L−1) such that a logical identifier may correspond to a single process executed on a compute node 102. With MPI these logical identifiers generally may be referred to as ranks. With OpenSHMEM, these logical identifiers generally may be referred to as processing elements (PEs). Other programming models may use other names for a similar purpose.

The compute nodes 102 assigned to execute the processes of a distributed application might or might not be a physically contiguous range of nodes (e.g., compute node 102*a*, compute node 102*b*, compute node 102*c*, and so on). For example, a distributed application may be assigned a non-contiguous range of physical compute nodes to execute processes of the distributed application (e.g., compute node 102*a*, compute node 102*c*, and compute node 102*m*). Furthermore, it may be unsecure to provide processes of the distributed application with the actual physical addresses of the compute nodes 102 and associated processes to which messages 112 may be directed (e.g., if the distributed application executes in a user space or are otherwise untrusted).

A process may be associated with a network address and a process identifier (e.g., a PID). The network address may represent the place where the process is running. For example, the network address may represent the compute node 102 on which the process is running, and in the case of Layer-2 communications and if the compute node 102 includes multiple NICs 110, the particular NIC 110 for communicating with that process. As another example, the network address may represent the compute node 102 on which the process is running, and in the case of Layer-3 communications and if the NICs 110 include multiple interfaces, the particular interface of a NIC 110 for communicating with that process. As multiple processes might be running at a particular network address, the PID for a process may be used in combination with the network address for the process to communicate with the process. Certain implementations of this disclosure focus on the network address portion of communicating with a process. This disclosure, however, contemplates making the PID part of the translation process, if appropriate.

For any of these or other reasons, within messages 112 processes may specify a logical network address for a destination process. A translation of the logical network address may be used to determine a translated network address for a destination process, so that the message 112 can be routed to the intended destination process, with the further use of a PID if appropriate. In certain implementations, in the case of Layer-2 addressing, the translated network address for the destination process may be a physical network address for the destination process. In certain implementations, in the case of Layer-3 addressing, the translated network address for the destination process may be a physical network address and/or another logical network address for the destination process. To this end, approaches to inter-node communication in multi-node networks may use a translation technique that converts a logical node identifier into a target physical node identifier and/or another target logical node identifier that is addressable or otherwise routable by the network, and a PID of a destination process may be used by the target physical node to execute an operation using the destination process in accordance with the inter-process communication. Some example messages 112 include memory operations such as "gets" to retrieve data (or a reference) from a memory associated with the destination process or "sets" to write data to the memory.

The network address translation may include translating the logical network address to a physical network address (e.g., in the case of Layer-2 communications) and/or to an Internet Protocol (IP) address (e.g., in the case of Layer-3 communications). In certain implementations, a physical network address for a destination process is a physical address of a NIC (e.g., a NIC 110) of a compute node (e.g., a compute node 102) on which the destination process is executing. As described above, a compute node 102 may include one or more NICs 110, and each NIC 110 may have an associated physical network address. Each NIC 110 may have one or more network interfaces, and an IP address may be associated with a particular network interface. Thus, in certain implementations, a translated network address for a destination process may include a physical address of a NIC (e.g., a NIC 110) of a compute node (e.g., a compute node 102) on which the destination process is executing and/or an IP address of a particular network interface of a NIC.

Certain implementations of this disclosure provide a multi-part network address translation process to translate a logical network address for a destination process to a translated network address for the destination process. In certain implementations, the network address translation process is performed by a NIC 110, which may be a hardware component, rather than in software.

In operation of an example implementation, a NIC 110 of a sending compute node 102 may receive a request for inter-process communication associated with a sending process of a distributed application. The request may include a logical network address for a destination process of the distributed application. The destination process may be on another compute node 102 of system 100. NIC 110 of the sending compute node 102 may execute a network address translation process to translate the logical network address for the destination process to a translated network address for the destination process. In certain implementations, the network address translation process includes the NIC 110 of the sending compute node 102: executing, using a first portion of the logical network address, a lookup of a network address translation table to determine a first address; determining a translation modifier by executing a translation algorithm using a second portion of the logical network address; and determining the translated network address using the first address and the translation modifier. The NIC 110 of the sending compute node 102 may process a first message using the translated network address for the destination process.

In certain implementations, the first address is a Layer-2 physical base translation address and the translated network address is a Layer-2 physical addresses offset from the first address according to the translation modifier. In certain implementations, the first address is a Layer-3 base translation address and the translated network address is a Layer-3 address derived from the Layer-3 base translation address according to the translation modifier.

The sending process and the destination process may execute on a same compute node 102 or on different compute nodes 102. For example, the destination process may be on the same or on another compute node 102 of system 100 as the NIC 110 of the receiving compute node 102. Although the message passing and associated network address translation of FIG. 1 are described primarily as messages 112 being sent from one compute node 102 to another compute node 102, this disclosure contemplates messages 112 being sent from one processor 106 to a different processor on a same compute node 102. The sending process and the destination process might execute on different cores of a same processor 106 of the same compute node 102.

Although FIG. 1 illustrates concepts associated with this disclosure in the context of a particular system 100, which potentially could be an HPC environment, this disclosure contemplates system 100 being any suitable computing environment, however simple or complex, in which processing components communicate messages with one another that involve a network address translation. For example, system 100 may include any suitable types and numbers of electronic processing devices, including a single processing device, multiple processing devices, multiple processing devices that communicate over a computer network, an enterprise network, or any other suitable type(s) of processing devices in any suitable arrangement, some of which may overlap in type. System 100 could be a local computing environment (e.g., a private computing environment), a cloud computing environment (e.g., a public computing environment), a hybrid computing environment (e.g., a private computing environment and a public computing environment), or another suitable type of computing environment.

Figure 2:
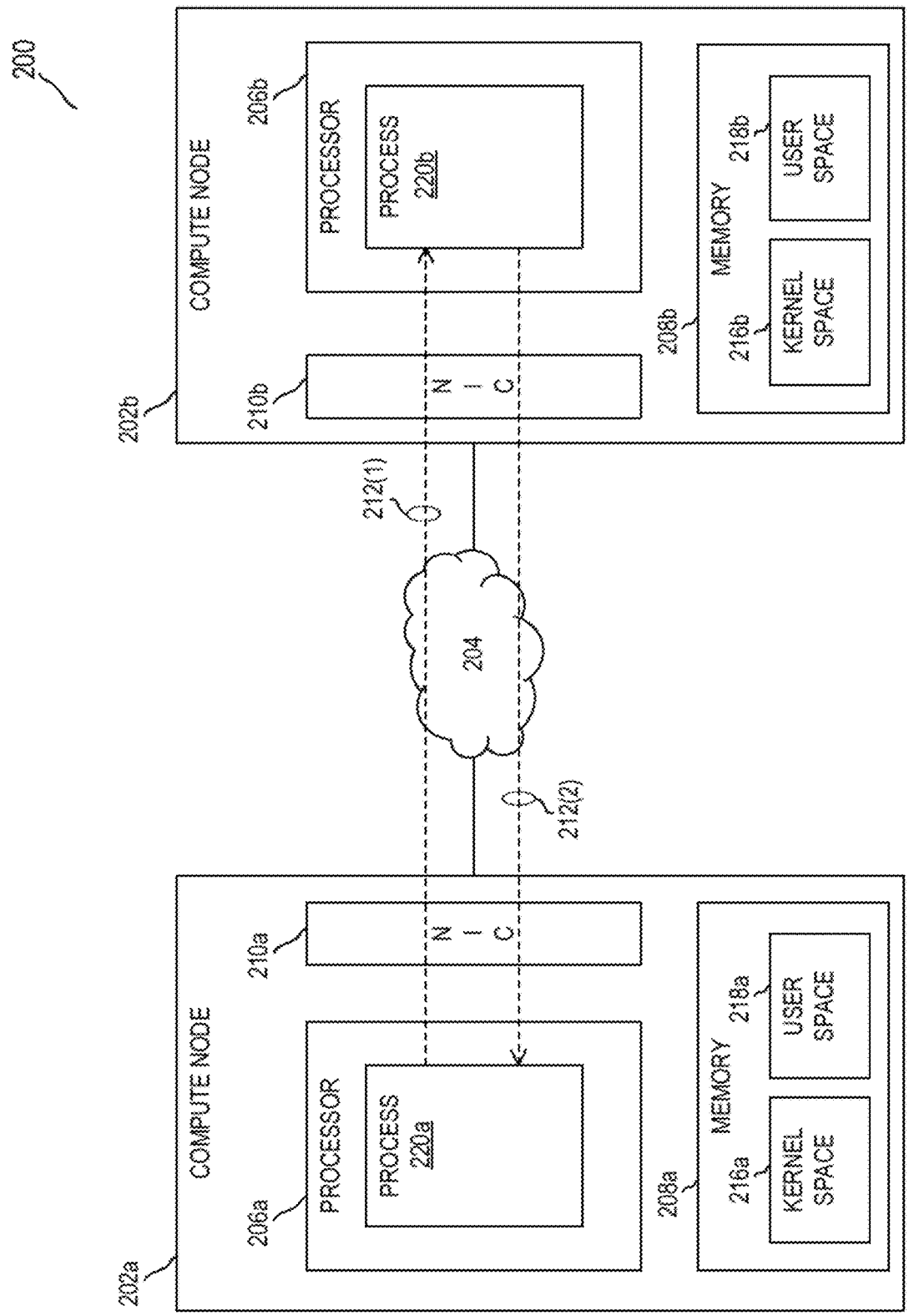
FIG. 2 illustrates an example system for network address translation, according to certain implementations.

FIG. 2 illustrates an example system 200 for network address translation, according to certain implementations. In particular, FIG. 2 illustrates additional details of example compute nodes and sending of messages using a multiphase network address translation process.

System 200 includes compute node 202a and compute node 202b, which may communicate via communication network 204. Compute nodes 202a and 202b may be examples of compute nodes 102 of FIG. 1. Communication network 204 may be analogous to communication network 104 of FIG. 1.

Taking compute node 202a as an example, compute node 202a includes processor 206a, memory 208a, and NIC 210a, which may be analogous to processor 106, memory 108, and NIC 110, respectively, of FIG. 1. Processor 206a of compute node 202a may be one of one or more processors 206a of compute node 202a. Processor 206a may be a processing core and/or may include one or more processing cores.

Memory 208a may include kernel space 216a and user space 218a. Kernel space 216a generally refers to a reserved area of memory (e.g., memory 208a) for running a privileged operating system kernel, kernel extensions, and one or more device drivers. User space 218a generally refers to an area of memory (e.g., memory 208a) for running code outside the operating system kernel and generally includes running software applications. Typically, user space 218a is less secure than kernel space 216a.

Compute node 202b includes similar components to those described above with reference to compute node 202a, although compute nodes 202a and 202b might or might not be implemented in a similar manner in various implementations. In the illustrated example, compute node 202b includes processor 206b, memory 208b, and NIC 210b. Processor 206b of compute node 202b may be one of one or more processors 206b of compute node 202b. Processor

206*b* may be a processing core and/or may include one or more processing cores. Memory 208*b* may include kernel space 216*b* and user space 218*b*, which may be similar to kernel space 216*a* and user space 218*a*, respectively, described above.

In the illustrated example, compute nodes 202*a* and 202*b* are being used to execute respective processes of a distributed application. For example, processor 206*a* of compute node 202*a* is executing a process 220*a*, and processor 206*b* of compute node 202*b* is executing a process 220*b*. Processes 220*a* and 220*b* may be referred to generally as process/processes 220. One or more cores of the compute node 202*a*/202*b* may execute each process 220*a*/220*b*, and may provide at least one hardware thread per process, although multiple processes 220 may be scheduled on a same hardware thread. Although process 220*a* is shown within processor 206*a* to reflect that processor 206*a* is executing process 220*a*, in certain implementations process 220*a* may reside in memory 208*a*. For example, process 220*a* may reside in kernel space 216*a* and/or user space 218*a*. Similarly, although process 220*b* is shown within processor 206*b* to reflect that processor 206*b* is executing process 220*b*, in certain implementations, process 220*b* may reside in memory 208*b*. For example, process 220*b* may reside in kernel space 216*b* and/or user space 218*b*.

Process 220*a* of compute node 202*a* may communicate a message 212(1) to process 220*b* of compute node 202*b*. In other words, for message 212(1), compute node 202*a* is the sending compute node and process 220*a* is the sending process, and compute node 202*b* is the receiving compute node and process 220*b* is the receiving/destination process. Process 220*a* may send message 212(1) via NIC 210*a* of compute node 202*a*, and process 220*b* may receive message 212(1) via NIC 210*b* of compute node 202*b*. NIC 210*a* and NIC 210*b* may be analogous to NIC 110 of FIG. 1, although NIC 210*a* and NIC 210*b* might or might not be identical in various implementations.

As described above, as sent by process 220*a* to NIC 210*a* and as received by NIC 210*a* from process 220*a*, message 212(1) may include a logical network address for destination process 220*b* of compute node 202*b*. NIC 210*a* may execute a multiphase network address translation process to translate the logical network address of destination process 220*b* to a translated network address of destination process 220*b*. NIC 210*a* may then facilitate transmission of message 212(1) to destination process 220*b* via communication network 204 and using the translated network address determined by NIC 210*a*.

In operation of an example implementation, on the send side for sending message 212(1), NIC 210*a* of a sending compute node 202*a* may receive a request for inter-process communication associated with sending process 220*a* of a distributed application. The request may include a logical network address of destination process 220*b* of the distributed application. In the illustrated example, destination process 220*b* is on another compute node 202*b* of system 200, but in certain scenarios, the destination process could be another process on sending compute node 202*a*. NIC 210*a* of sending compute node 202*a* may execute a network address translation process to translate the logical network address of destination process 220*b* to a translated network address of destination process 220*b*. In certain implementations, the network address translation process includes the NIC 210*a* of sending compute node 202*a* executing, using a first portion of the logical network address, a lookup of a network address translation table to determine a first address; determining a translation modifier by executing a translation algorithm using a second portion of the logical network address; and determining the translated network address using the first address and the translation modifier. The NIC 210*a* of sending compute node 202*a* may process message 212(1) using the translated network address of destination process 220*b*. For example, NIC 210*a* may facilitate transmission of message 212(1) to destination process 220*b* via communication network 204 and using the translated network address.

In certain implementations, compute nodes 202*a* and 202*b* may be able to both send and receive messages 212. In the example illustrated in FIG. 2, compute node 202*a* sends message 212(1) to compute node 202*b*, which receives message 212(1). Compute node 202*b* may perform a similar sender-side multiphase network address translation process for sending message 212(2) to a destination process 220*a* of compute node 202*a* to that described above with reference to compute node 202*a* and message 212(1).

Figure 3:
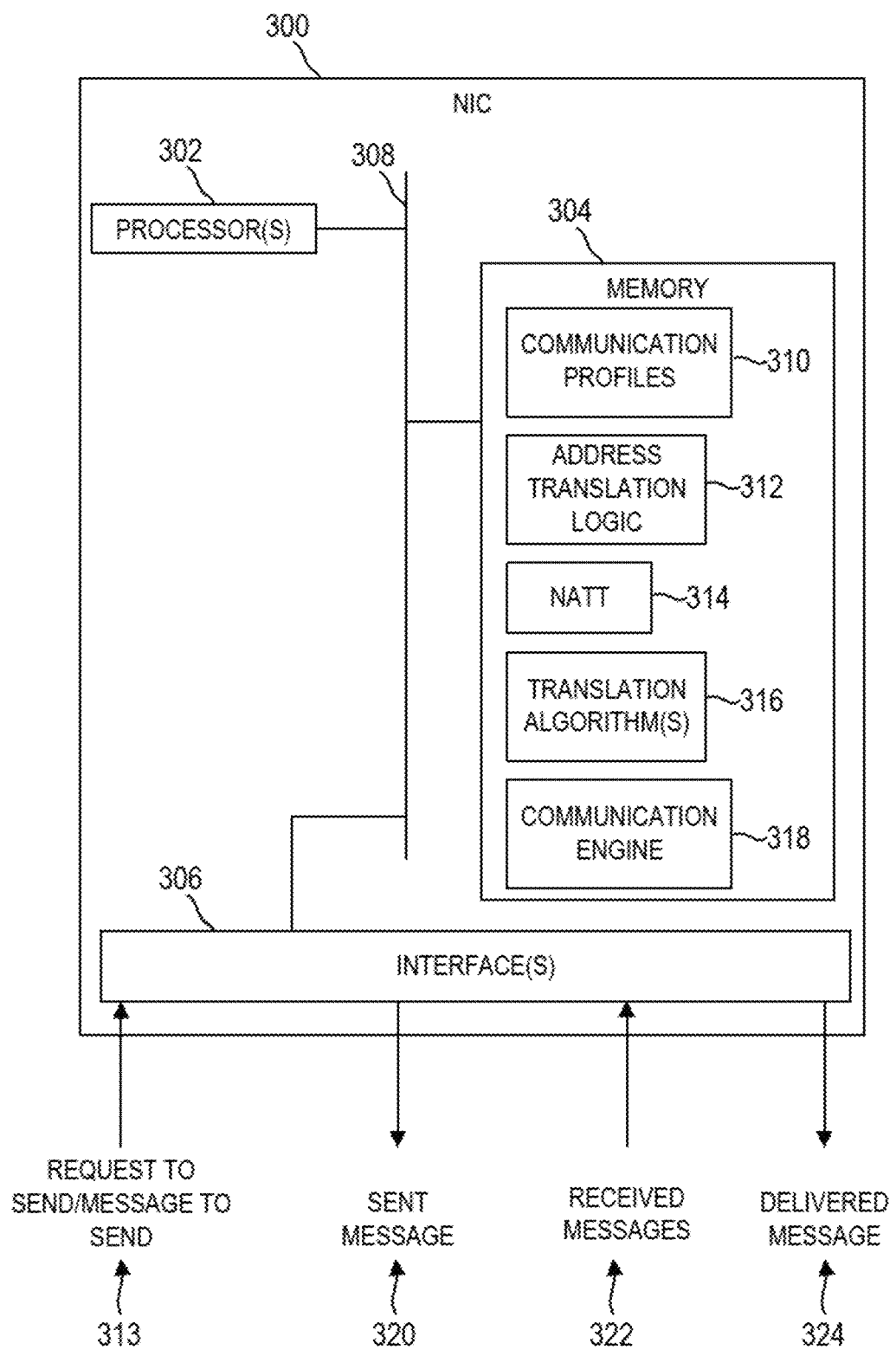
FIG. 3 illustrates an example network interface controller (NIC), according to certain implementations.

FIG. 3 illustrates an example NIC 300, according to certain implementations. NIC 300 could be an example of NIC 110 of FIG. 1 and/or NIC 210*a*/210*b* of FIG. 2.

In the illustrated example, NIC 300 includes one or more processors 302, memory 304, and one or more interfaces 306, all of which may communicate using network 308. The one or more processors 302 may be any component or collection of components adapted to perform computations and/or other processing-related tasks. Processors 302 can be, for example, a microprocessor, a microcontroller, a control circuit, a digital signal processor, a field-programmable gate array (FPGA), an application-specific integrated circuit (ASIC), a system-on-chip (SoC), or combinations thereof. Processor 302 may include one or more processing cores. Processor 302 may include any suitable number of processors, or multiple processors may collectively form a single processor 302.

Memory 304 may include any suitable combination of volatile memory, non-volatile memory, and/or virtualizations thereof. For example memory may include any suitable combination of magnetic media, optical media, RAM, ROM, removable media, and/or any other suitable memory component. Memory 304 may include data structures used to organize and store all or a portion of the stored data.

Interfaces 306 represent any suitable computer element that can receive information from a communication network (e.g., communication network 104/204 of FIGS. 1/2, network 308 of FIG. 3, etc.) and transmit information through a communication network (e.g., communication network 104/204 of FIGS. 1/2, network 308 of FIG. 3, etc.), or both. Interfaces 306 represent any port or connection, real or virtual, including any suitable combination of hardware, firmware, and software, including protocol conversion and data processing capabilities, to communicate through a LAN, WAN, or other communication system that allows information to be exchanged. Interfaces 306 may facilitate wireless and/or wired communication. In certain implementations, at least a portion of communication network 104/204 is a high speed interconnect, such as one or more Ethernet networks, one or more INFINIBAND networks, one or more CXL networks, and/or one or more proprietary networks, and one or more of interfaces 306 are configured to facilitate communication over such high speed interconnects. Interfaces 306 may facilitate the communication and/or receipt of inter-process communications, such as messages 112/212 of FIGS. 1/2.

Network 308 may include any suitable wired or wireless communication medium for the components of NIC 300 to communicate with one another. For example, network 308 may include any suitable combination of a bus or communication network. As a particular example, network 308 may represent an on-chip network of NIC 300.

Returning to memory 304, in the illustrated example, memory 304 stores control plane states 310, address translation logic 312, network address translation table (NATT) 314, one or more translation algorithms 316, and communication engine 318. Although described as being part of memory 304, this disclosure contemplates any of these items being part of (partially or entirely) or separate from memory 304. As just two examples, address translation logic 312 and/or communication engine 318 may be separate functional units that may include their own respective memories of instructions and/or that may reference instructions stored on memory 304, if appropriate. Each of the above-identified items of memory 304 is described in greater detail below.

Control plane states 310 may store a trustworthiness state (e.g., a control plane state) of applications and associated processes, which may allow NIC 300 to make certain decisions about messages communicated by processes executing on a compute node (e.g., a compute node 102 of FIG. 1 or compute node 202 of FIG. 2) for which NIC 300 handles communications. For example, a trusted state may be used when the operating system of a compute node 102 on which NIC 300 is installed is trusted to write to the control plane state 310, while an untrusted state may mean that the operating system of a compute node 102 on which NIC 300 is installed is untrusted. In an untrusted state, a control plane state 310 may be programmed by a network management system (e.g., a network management system associated with managing system 100 of FIG. 1).

Control plane states 310 may store information regarding performing network address translations for inter-process communications (e.g., messages 112/212) of applications and associated processes, which may allow NIC 300 (e.g., address translation logic 312) to make certain decisions about how to perform network address translations for messages communicated by processes executing on a compute node (e.g., a compute node 102 of FIG. 1 or compute node 202 of FIG. 2) for which NIC 300 handles communications. For example, control plane states 310 may store information for selecting which of the one or more possible NATTs 314 to use for executing a network address translation process for messages communicated by processes executing on a compute node (e.g., a compute node 102 of FIG. 1 or compute node 202 of FIG. 2) for which NIC 300 handles communications. As another example, control plane states 310 may store information for selecting which of the one or more translation algorithms 316 to use for executing a network address translation process for messages communicated by processes executing on a compute node (e.g., a compute node 102 of FIG. 1 or compute node 202 of FIG. 2) for which NIC 300 handles communications.

Address translation logic 312 may store the instructions for executing the multiphase network address translation process for messages communicated by processes executing on a compute node (e.g., a compute node 102 of FIG. 1 or compute node 202 of FIG. 2) for which NIC 300 handles communications, according to certain implementations. Address translation logic 312 may receive requests 313 from processes executing on a compute node (e.g., a compute node 102 of FIG. 1 or compute node 202 of FIG. 2) for which NIC 300 handles communications and arrange for transmission of messages 320 in response to those requests 313. Address translation logic 312 may perform network address translations in accordance with the techniques described throughout this disclosure.

NATT 314 is a data structure (e.g., a table) with entries (e.g., rows) that map logical network addresses to another network address. For example, the data structure of NATT 314 may be a table, and the entries may be rows of the table that map logical network addresses to another network address. In a particular example, NATT 314 may map logical network addresses (e.g., LNIDs) to physical network addresses, such as may be the case for Layer-2 addresses. As another example, NATT 314 may map logical network addresses (e.g., LNIDs) to another logical network addresses, such as may be the case for Layer-3 addresses. For reasons described throughout this disclose, NATT 314 may store less than all possible logical network address-to-other address (e.g., physical network address and/or another logical network address) mappings, and thereby have a reduced size. To that end, NATT 314 may map logical network addresses (e.g., LNIDs) to corresponding base translation addresses (e.g., physical addresses and/or logical addresses) from which additional logical network address-to-other address (e.g., physical network address and/or another logical network address) mappings may be determined, using a translation algorithm 316, for example, as described in greater detail below.

Although described primarily as a table, NATT 314 may have any suitable data structure. Additional details regarding an example NATT 314 and associated lookup for determining a base translation address from a logical network address are described below with reference to NATT 508 of FIG. 5.

NATT 314 may be a shared resource used by some or all of the applications/processes running on a compute node. The control plane state 310 for the application may specify the set of entries of the NATT 314 to be used by a process. In certain implementations, memory 304 stores multiple NATTs 314 and address translation logic 312 selects an appropriate NATT 314 to use for a particular network address translation for a particular request 313 or received message 322. In certain implementations, address translation logic 312 may select the appropriate NATT 314 according to information stored in the control plane state 310 for the application/process associated with the request 313/message 322.

Memory 304 may store one or more translation algorithms 316. NIC 300 may use a translation algorithm 316 to determine a translation modifier. In general, translation algorithms 316 allow an NATT 314 of a particular size to be expanded to a larger effective size or to support more users with a given size by calculating additional network addresses according to certain portions of a logical network address.

In certain implementations, NIC 300 determines a translation modifier by executing a translation algorithm 316 using a second portion of the logical network address of the request 313/message 322, which may be the same or different than the first portion of the logical network address that is used to determine a base translation address using NATT 314. In certain implementations, the second portion of the logical network address includes a logical process identifier. In certain implementations, the second portion of the logical network address is the entire logical network address. A translation algorithm 316 may be designed to generate a particular number of possible translation modifiers, with the value for the translation modifier that is generated for a particular logical network identifier (from the particular number of possible translation modifiers) depending on the value of the second portion of the logical network identifier. In certain implementations, the translation modifier is an offset that can be added to the base translation address determined through the table lookup performed using NATT 314 and the first portion of the logical network address to determine a translated network address.

Figure 5:
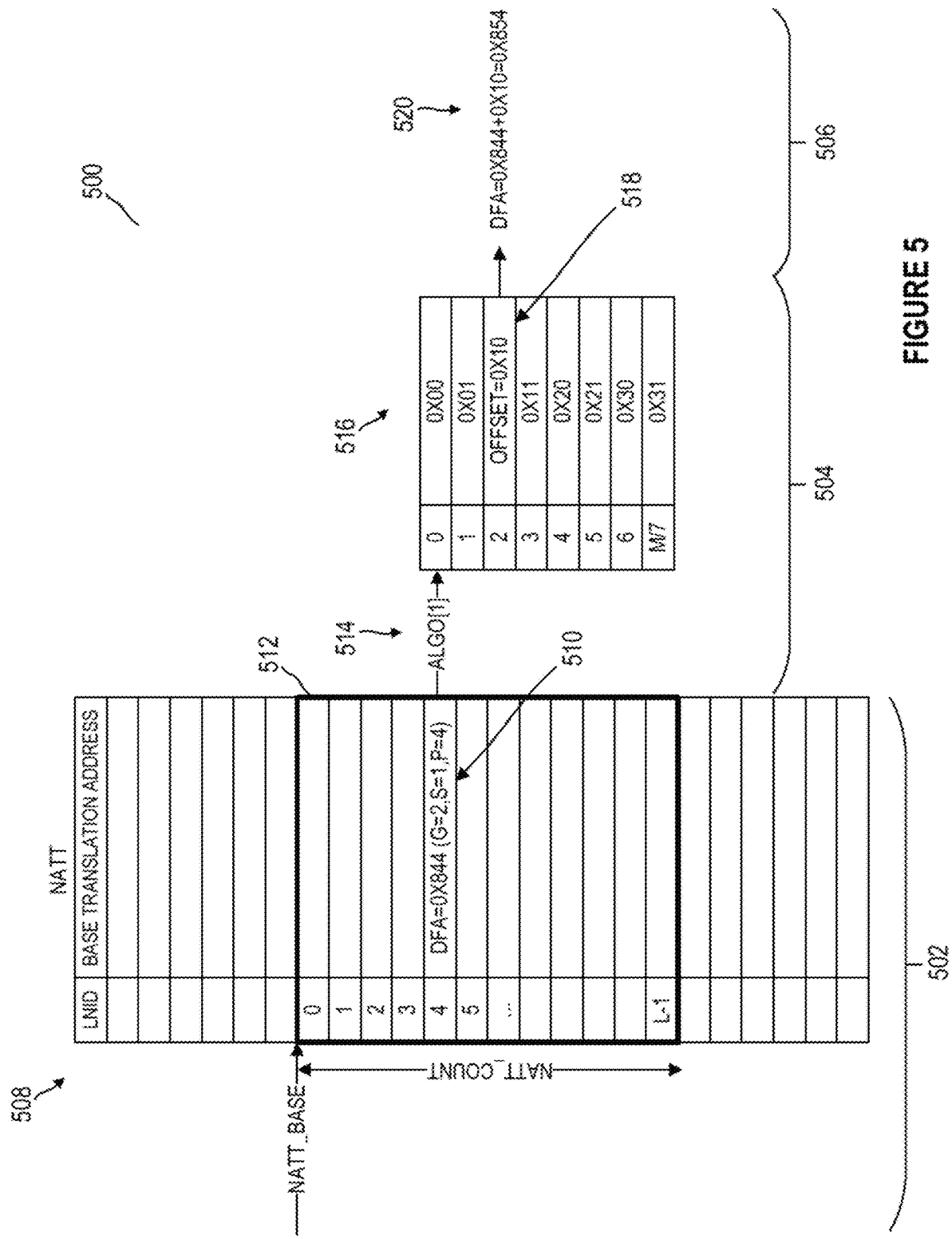
FIG. 5 illustrates an example network address translation process, according to certain implementations.
Figure 6:
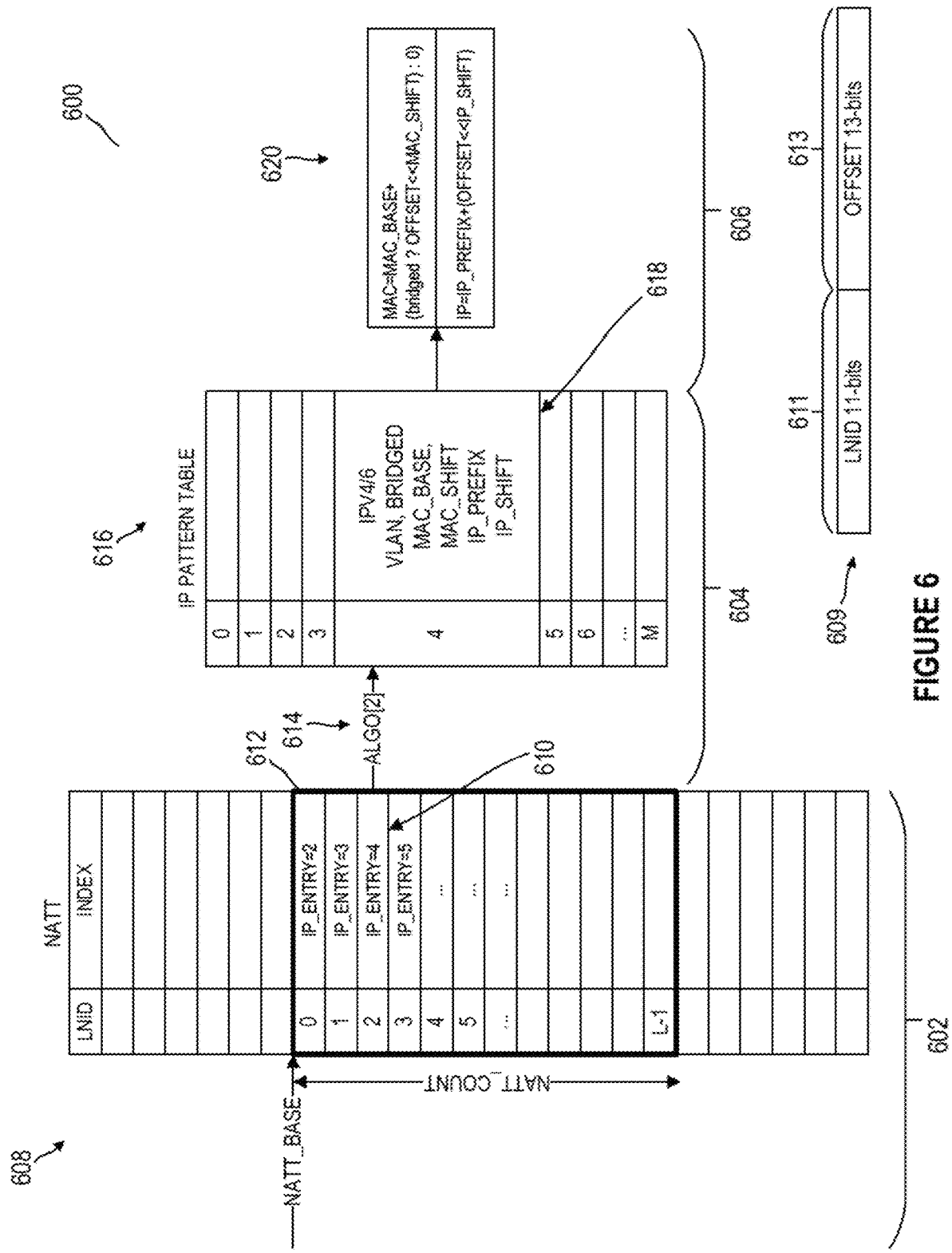
FIG. 6 illustrates an example network address translation process, according to certain implementations.

Additional details regarding an example translation algorithm 316 and associated determination of a translation algorithm from a logical network address are described below with reference to translation algorithm 514 of FIG. 5 and translation algorithm 614 of FIG. 6. Furthermore, additional details regarding using the base translation address determined from the table lookup using NATT 314 and using the translation modifier determined using a translation algorithm 316 to determine a translated network address are described below with reference to FIGS. 5 and 6. It should be understood, however, that the particular translation algorithms and associated techniques described with reference to FIGS. 5 and 6 are provided as examples only. This disclosure contemplates using other suitable types of translation algorithms 316.

Continuing with FIG. 3, in certain implementations, multiple translation algorithms 316 may be available to NIC 300, and NIC 300 may select an appropriate translation algorithm 316 for a given network address translation. As just one example, the multiple translation algorithms 316 may correspond to different manufacturers of compute nodes (e.g., compute nodes 102 of FIG. 1), and NIC 300 may be programmed to select the translation algorithm 316 for the types of compute nodes that are executing the distributed application. In certain implementations, NIC 300 may select the appropriate translation algorithm 316 according to information stored in the control plane state 310 for the application/process associated with the request/message.

Communication engine 318 may generate messages 320 for transmission via interface 306 to a receiving process on a receiving compute node (e.g., process 220b on compute node 202b in FIG. 2). Based on the request 313 to send an inter-process communication, and after performing a network address translation to translate a logical network address to a translated network address, communication engine 318 may generate messages 320 that include or are otherwise routed according to the appropriate translated network address. For example, communication engine 318 may generate the message 320 in the form of one or more packets that have the appropriate translated address, as determined from the multiphase network address translation process executed by address translation logic 312. The generated messages 320 may have a format appropriate for the communication medium over which the messages are to be communicated (e.g., CXL, Ethernet, Slingshot, Infiniband, proprietary, etc.)).

In NIC 300, communication engine 318 may, in part, manage a control plane used to maintain one or more routing tables that list which route to use to forward a data packet, and through which physical interface connection (e.g., output ports) of interface(s) 306. The control plane may perform this operation using internal preconfigured directives, called static routes, or by learning routes dynamically using a routing protocol. Static and dynamic routes may be stored in one or more of the routing tables. The control plane logic may remove non-essential directives from the table and build a forwarding information base (FIB) to be used by a data plane.

Interfaces 306 facilitate communication of messages via one or more communication media (e.g., CXL, Ethernet, Slingshot, Infiniband, proprietary, etc.)). In certain implementations, interfaces 306 include one or more ports. Interfaces 306 may facilitate communication (including transmission and/or reception) of messages (e.g., messages 112 of FIG. 1; messages 212(1) and/or messages 212(2) of FIG. 2; requests 313 and messages 320, 322, and 324 of FIG. 3; and the like). Interfaces 306 may be implemented using any suitable combination of hardware, firmware, and software.

In certain implementations, NIC 300 receives, from a management computer system, programming of NATT 314 and an indicator of the translation algorithm 316. This could be the case, for example, if the operating system is untrusted. In certain implementations, NIC 300 receives, from an operating system of a compute node coupled to NIC 300, programming of NATT 314 and an indicator of the translation algorithm 316. This could be the case, for example, if the operating system is trusted.

NIC 300 may be implemented using any suitable combination of hardware, firmware, and software. Some or all of the components of NIC 300 may include programming for execution by processor 302, the programming including instructions to perform some or all of the functionality of NIC 300. As just two examples, address translation logic 312 and communication engine 318 (along with any of the other components of NIC 300) may include programming for execution by processor 302, the programming including instructions to perform some or all of the functionality of NIC 300, including executing the network address translation of this disclosure.

At least a portion of memory 304 may be considered a computer-readable medium on which computer code (e.g., instructions, such as may be associated with address translation logic 312 and/or communication engine 318, as just two examples) is stored. References to computer-readable medium, computer-readable storage medium, computer program product, tangibly embodied computer program, or the like, or a controller, circuitry, computer, processor, or the like should be understood to encompass not only computers having different architectures such as single or multi-processor architectures and sequential (Von Neumann) or parallel architectures but also specialized circuits such as FPGAs, ASICs, signal processing devices, and other devices. References to computer program, instructions, logic, code, or the like, should be understood to encompass software for a programmable processor or firmware such as, for example, the programmable content of a hardware device whether instructions for a processor, or configuration settings for a fixed-function device, gate array or programmable logic device, or the like.

Figure 4:
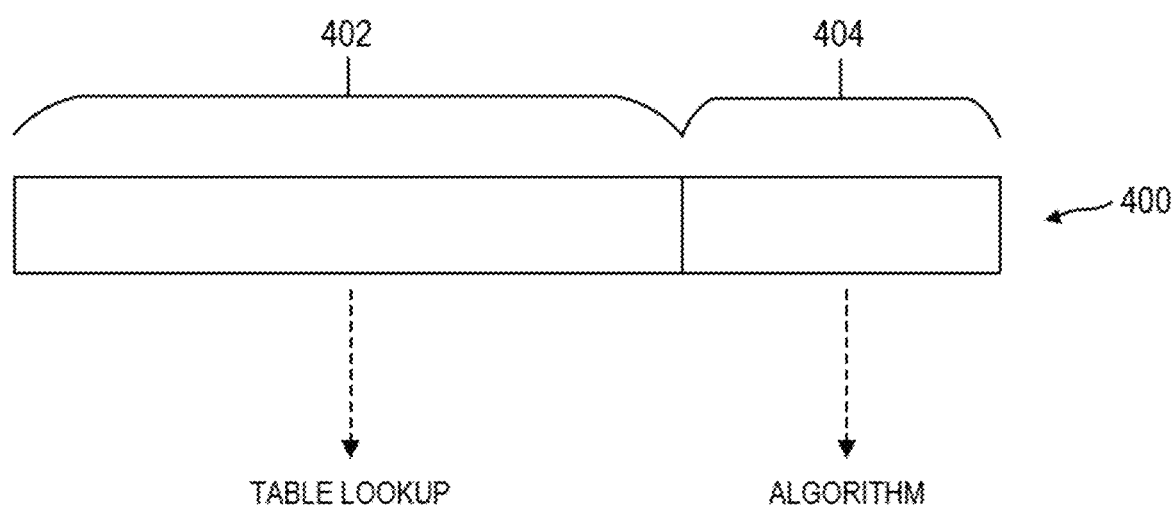
FIG. 4 illustrates an example logical network address, according to certain implementations.

FIG. 4 illustrates an example logical network address 400, according to certain implementations. In this example, logical network address 400 includes a first portion 402 and a second portion 404. Each of first portion 402 and second portion 404 could have any appropriate size (e.g., any suitable number of bits), including any suitable relative size. Although not shown to overlap, first portion 402 and second portion 404 could overlap, partially or entirely, in certain implementations. Logical network address 400 may have any suitable size. As examples, logical network address 400 may be a 24-bit number, a 32-bit number, or any other suitable size number.

In certain implementations, the network address translation process includes executing, using first portion 402 of logical network address 400, a lookup of a network address translation table (e.g., NATT 314 of FIG. 3) to determine a first address, which could be considered a base translation address. The first address (e.g., the base translation address) could be a physical network address (e.g., for a Layer-2 network address translation) or another logical network address (e.g., for a Layer-3 network address translation). In certain implementations, the network address translation process includes determining a translation modifier by executing a translation algorithm using second portion 404 of logical network address 400.

In certain implementations, first portion 402 of logical network address 400 includes a logical endpoint address, which identifies a particular compute node (e.g., a particular compute node 102 of multiple compute nodes 102) associated with a destination process. In certain implementations, second portion 404 of logical network address 400 includes an identifier of (or information that can be used to determine) a particular NIC of a plurality of NICs of a compute node (e.g., a particular NIC 110 of a number of NICs 110 of a compute node 102) associated with the destination process (for Layer-2 network address translation) or a particular interface of multiple interfaces of a NIC of a compute node (e.g., a particular NIC 110 of a number of NICs 110 of a compute node 102) associated with the destination process (for Layer-3 network address translation).

Although first portion 402 is shown to occur prior to second portion 404 in logical network address 400, first portion 402 and second portion 404 each may include any suitable portions of logical network address 400, including non-consecutive portions. In certain implementations, first portion 402 (e.g., the portion used to perform a table lookup) includes upper bits of logical network address 400, and second portion 404 (e.g., the portion to which the algorithm is applied) includes lower bits of logical network address 400. For example, first portion 402 may be bits of relatively higher significance than bits of second portion 404. As a particular example, first portion 402 may be the most significant bits, as those higher-significant bits move the least rapidly, and second portion 404 may be the least significant bits, as those lower significant bits move the most rapidly. As a more particular example, logical network address 400 may be a 24-bit number, first portion 402 may be up to 15 bits (e.g., to index into the lookup table), and some or all of the remaining bits (e.g., 9 or more) may be feed into the translation algorithm. As an even more particular example, in an implementation in which logical network address 400 is to be used for a Layer-3 translation and is a 24-bit number, first portion 402 could specify an LNID using 11 bits and second portion 404 could specify an offset using 13 bits.

FIG. 5 illustrates an example network address translation process 500, according to certain implementations. In certain implementations, some or all of the operations of network address translation process 500 may be executed by a NIC, such as NIC 110 of FIG. 1, NIC 210a/210b of FIG. 2, or NIC 300 of FIG. 3, as examples. For simplicity, this disclosure refers to network address translation process 500 as being performed by NIC 300 of FIG. 3. In some implementations, network address translation process 500 is capable of translating a logical address to a physical address, such as a Layer-2 logical address to a Layer-2 physical address.

As described above, NIC 300 may receive a request (e.g., a request 313 of FIG. 3) for inter-process communication associated with a sending process of a distributed application, and that request may include or otherwise refer to a logical network address of a destination of the inter-process communication (e.g., a destination process of a destination compute node). NIC 300 may execute network address translation process 500 to translate the logical network address for a destination process (e.g., a logical Layer-2 address for a destination process) to a translated network address for the destination process (e.g., a physical Layer-2 address for the destination process, which, as described above, may be a physical address of a NIC). In some implementations, the logical network address may be or include an LNID. Network address translation process 500 has multiple phases, including a table lookup phase 502, an algorithm application phase 504, and a translated address determination phase 506, each of which are described below.

During table lookup phase 502, NIC 300 executes, using a first portion of the logical network address (e.g., first portion 402 of logical network address 400 of FIG. 4), a lookup of an NATT 508 to determine a base translation address 510. In certain implementations, the first portion of the logical network address includes a logical endpoint address of a compute node (e.g., a compute node 102, a compute node 202a/202b, etc.) on which the destination process is executing or otherwise located. In certain implementations, the physical network addresses in NATT 508 are indexed according to entire logical network addresses (e.g., LNIDs), and NIC 300 executes the table lookup using the entire logical network address for the destination process such that the first portion of the logical network address is the entire logical network address.

NATT 508 may be an example of NATT 314 of FIG. 3. In certain implementations, NATT 508 includes multiple possible base translation addresses, as illustrated in the second column of NATT 508, indexed according to multiple logical network addresses (e.g., LNIDs, as illustrated in the first column of NATT 508). Additionally or alternatively, in certain implementations, the multiple possible first addresses (e.g., base translation addresses) of NATT 508 are indexed according to first portions of the multiple logical network address, and that first portion could represent logical endpoint addresses of the compute node on which the destination node is executing or otherwise located. The base translation addresses could be physical addresses (e.g., in the case of layer-2 communications or certain Layer-3 communications) or another intermediate logical address (e.g., in the case of certain Layer-3 communications).

In certain implementations, the structure of NATT 508 is programmed using a description of the particular compute nodes (e.g., compute nodes 102 of system 100 of FIG. 1). For example, NATT 508 may be programmed according to the physical structure of the system (e.g., system 100 of FIG. 1) and the associated communication network (e.g., communication network 104 of FIG. 1), including the network locations of particular compute nodes (e.g., compute nodes 102 of system 100 of FIG. 1) that are engaging in inter-process communications.

A block 512 (as shown by the bolded rectangle surrounding selected entries of NATT 508) of those LNID-physical address pairs may be assigned to the particular application and/or process associated with the inter-process communication/message. In the illustrated example, block 512 begins at NATT_Base entry and includes L entries (0 through L−1), with L representing an NATT_Count. Although shown to be contiguous within the illustrated example of NATT 508, in certain implementations block 512 of LNID-physical address pairs assigned to the particular application and/or process associated with the inter-process communication/message could be non-contiguous within NATT 508. In certain implementations, the control plane state for the application associated with the request/message may specify the set of entries of NATT 508 (the block 512 of NATT 508) to be used for the particular application and/or process.

In some implementations, NIC 300 executes, using the first portion of the logical network address (e.g., first portion 402 of logical network address 400 of FIG. 4) of the request/message, a lookup of NATT 508 to determine base translation address 510 at least in part by determining the first portion of the logical network address of the request/message and determining, from NATT 508, a particular base translation address indexed according to the first portion of the logical network address. NIC 300 may determine that the particular base translation address is the base translation address for the logical network address that NIC 300 is translating. As described above, in certain implementation, the first portion of the logical network address (e.g., first portion 402 of logical network address 400 of FIG. 4) identifies a particular compute node (e.g., a particular compute node 102 of multiple compute nodes 102).

Table lookup phase 502 may avoid direct use of the first address (e.g., a base translation address, such as the physical address (e.g., for Layer-2, destination fabric address (DFA) in this example) or logical address (e.g., for Layer-3)) by the requesting application/process, which instead uses the logical network address (e.g., logical network address 400 of FIG. 4). The hardware (e.g., NIC 300) can be bound to perform the lookup within the block 512 of logical network addresses assigned to the requesting application/process (e.g., as defined in the appropriate control plane state) such that if NIC 300 attempts to perform a table lookup outside the assigned range, the lookup fails.

For example, in certain implementations, NIC 300 may determine, according to the logical network address of the request/message (e.g., according to the first portion of the logical network address), the block of NATT 508 entries that correspond to the request/message (e.g., block 512 in the illustrated example). To validate that the request/message is legitimate, NIC 300 may access the control plane state (e.g., of control plane states 310 of FIG. 3) for the application/process associated with the request/message to identify a block (which might or might not be block 512) of NATT 508 available/assigned to that application/process. If NIC 300 determines that the logical network address (e.g., the first portion of the logical network address) falls outside the block of NATT 508 entries (e.g., according to the logical network address index) available/assigned to the application/process associated with the request/message, then NIC 300 may reject the request/message and not perform the network address translation. If, on the other hand, NIC 300 determines that the logical network address (e.g., the first portion of the logical network address) is within the block of NATT 508 available/assigned to the application/process associated with the request/message, then NIC 300 may proceed with performing the network address translation. This disclosure contemplates omitting this validation and/or performing this validation in any suitable manner. In some implementations, this validation might be omitted on a per-application basis at the discretion of the control plane.

In the illustrated example of FIG. 5, NIC 300 determines, according to a control plane state for the application/process associated with the request/message, that block 512 of NATT 508 is a permissible block for the application/process that submitted the request/message. Additionally, in table lookup phase 502 and using a first portion of the logical network address of the request/message, NIC 300 identifies LNID 4 and accordingly determines that the base translation address for the logical network address of the request/message is the physical destination fabric address (DFA) 0x844 (G-2,S=1,P=4). This DFA may be an example of a Dragonfly network topology, with G representing the group, S representing the switch, and P representing the port on that switch. This DFA and a Dragonfly network topology are provided as examples only. This disclosure contemplates a DFA for a Dragonfly network topology being represented differently. Furthermore, this disclosure contemplates the DFA being represented in any suitable manner for the type of network topology implemented of the system (e.g., system 100).

Having determined base translation address 510 at table lookup phase 502, during algorithm application phase 504, NIC 300 determines a translation modifier by executing a translation algorithm 514 using a second portion of the logical network address (e.g., second portion 404 of logical network address 400 of FIG. 4) of the request/message. As described above, in certain implementation, the second portion of the logical network address (e.g., second portion 404 of logical network address 400 of FIG. 4) identifies a particular NIC on a compute node identified by the first portion of the logical network address (e.g., a particular NIC 110 on the particular compute node 102 of FIG. 1 identified by first portion 402 of logical network address 400 of FIG. 4). In certain implementations, the second portion of the logical network address comprises a logical process identifier. In certain implementations, the second portion of the logical network address is the entire logical network address. Translation algorithm 514 may be an example of translation algorithms 316 of FIG. 3.

Continuing with FIG. 5, a translation algorithm 514 (e.g., Algo[1]) may be designed to generate a particular number of possible translation modifiers, with the particular generated value for the translation modifier generated for a particular logical network identifier depending on the value of the second portion of the logical network identifier. In the illustrated example, as reflected by translation modifier table 516, translation algorithm 514 is designed to generate M possible translation modifiers. In the illustrated example, the value of M indicates 8 possible translation modifiers.

In certain implementations, the translation modifier is an offset that can be added to the base translation address determined through table lookup phase 502 to determine the translation address for the logical network identifier associated with the request/message. In the illustrated example, executing translation algorithm 514 using the second portion of the logical network identifier results in NIC 300 determining translation modifier 518, which in this example is an offset value of 0x10. For other logical network identifiers associated with other requests/messages, a different value for the second portion of the logical network identifier may result in NIC 300 determining a different translation modifier of the possible translation modifiers (e.g., of translation modifier table 516) when executing translation algorithm 514 using the second portion of the logical network identifier.

Translation algorithm 514 exploits a regular, predictable structure of the system. For example, the system of compute nodes (e.g., compute nodes 102 of FIG. 1) associated with the requesting application/process (e.g., as defined in the appropriate control plane state) may include physical network addresses that exhibit a pattern exploitable by translation algorithm 514. The physical network addresses of NICs in a compute node may follow a regular pattern, and the physical network addresses of compute nodes in a rack or chassis, or compute nodes on a board, may follow regular patterns. In certain implementations, translation algorithm reflects how the compute nodes (e.g., compute nodes 102 of FIG. 1) are physically built (e.g., the physical location of the NICs of the compute nodes), including, potentially, regularity in the structure of the blades, if applicable. This physical structure may be defined by the type of the compute nodes.

In certain implementations, translation algorithm 514 might be the same for different instances of a same product.

In certain implementations, translation algorithm 514 may include a set of shift, mask, and addition operations performed on a second portion of the logical network address (e.g., second portion 404 of logical network address 400 of FIG. 4). Additionally or alternatively, the second portion of the logical network address (e.g., second portion 404 of logical network address 400 of FIG. 4) may index into a table. In certain implementations, regardless of the particular technique used for translation algorithm 514, translation algorithm 514 may encode that the compute nodes (e.g., compute nodes 102 of FIG. 1) of the system (e.g., system 100 of FIG. 1) and/or NICs 300 associated with block 512 have a similar, and possibly the same, structure.

In certain implementations, multiple translation algorithms 514 may be available to NIC 300, and NIC 300 may select an appropriate translation algorithm 514 for a given network address translation process 500. For example, the multiple translation algorithms 514 may correspond to different manufacturers of compute nodes (e.g., compute nodes 102 of FIG. 1), and NIC 300 may be programmed to select the translation algorithm 514 for the types of compute nodes that are executing the distributed application. As another example, the multiple translation algorithms 514 may correspond to different types of compute nodes (e.g., compute nodes 102 of FIG. 1) with different numbers of NICs 300, from the same or different manufacturers, and NIC 300 may be programmed to select the translation algorithm 514 for the types of compute nodes (having the appropriate number of NICs 300) that are executing the distributed application. In certain implementations, NIC 300 may select the appropriate translation algorithm 514 according to information stored in the control plane state for the application/process associated with the request/message.

Having determined translation modifier 518 at algorithm application phase 504, during a translated address determination phase 506, NIC 300 determines the translated network address 520 using the first address (e.g., base translation address 510) and the translation modifier (e.g., translation modifier 518). In certain implementations, translation modifier 518 is an offset and determining translated network address 520 using the first address (e.g., base translation address 510) and the translation modifier (e.g., translation modifier 518) includes summing the first address (e.g., base translation address 510) and the translation modifier (e.g., translation modifier 518). Although not the case in the illustrated example, in certain implementations, the translated network address could be the first address (e.g., the offset is zero according to translation algorithm 514, as shown at entry zero in translation modifier table 516). This might be the case, for example, in an implementation in which a compute node (e.g., compute node 102 of FIG. 1) includes only one NIC.

In the illustrated example of FIG. 5, the base translation address 510 determined from table lookup phase 502 is DFA=0x844 (G=2,S=1,P=4), translation modifier 518 is an offset determined according to algorithm application phase 504 to be 0x10, and the translated network address 520, as determined by summing the base translation address 510 and the translation modifier 518, is 0x854 (e.g., DFA=0x844+ 0x10=0x854).

Network address translation process 500 may allow NATT 508 to have a reduced size or to support more users with a given size while still providing, through translation algorithm 514, a larger number of addresses than are included in NATT 508. For example, NATT 508 may include L possible base translation addresses allocated to multiple processes for executing the distributed application, the multiple processes including the sending process and the destination process. Base translation address 510 is one of the L possible base translation addresses. Continuing with this example, for each of the L possible base translation addresses, translation algorithm 514 might be used to determine up to M translation modifiers (and, correspondingly, M possible translated network addresses) such that an effective size of NATT 508 for the distributed application is L×M. M is the number of addresses that result from translation algorithm 514, and may be an integer greater than one. In certain implementations, the M possible translated network addresses are offset from the first address (e.g., the base translation address) by respective amounts determinable according to translation algorithm 514. In the illustrated example of FIG. 5, translation algorithm 514 multiplies size of NATT 508 by a factor of 8, as translation algorithm produces 8 potential translation modifiers from one entry in NATT 508 (e.g., from one base translation address 510). Assuming NATT 508 has a table size of N (e.g., N rows) and that the described network address translation technique applies to all N rows, an effective size of NATT 508 in total could be N×M.

As a concrete example, if NATT 508 includes 32000 entries that are candidates for the base translation address, network address translation process 500 may provide up to 256,000 entries. In certain implementations, the base translation address corresponds to a network adapter (e.g., a NIC), which could be one of multiple network adapters (e.g., one of multiple NICs) on the destination compute node (x844 in this example), and the number of possible translation modifiers resulting from translation algorithm 514 indicates how many precise addresses are available for that base translation address. In the illustrated example, once the base translation address of 0x844 is determined, translation algorithm 514 reveals M network addresses directly related to 844. For this example, those addresses in hexadecimal are +0 (the base translation address itself), +1, +10, +11, +20, +21, +30, +31—eight addresses in a regular pattern-one of which will be determined when executing translation algorithm 514 using the second portion of the logical network address of the request/message.

In certain implementations, base translation address 510 is a Layer-2 physical base translation address and translated network address 520 is a Layer-2 physical addresses offset from base translation address 510 according to translation modifier 518. As described in greater detail below with reference to FIG. 6, some implementations may be capable of translating Layer-3 addresses (e.g., IP addresses).

For purposes of the example shown in FIG. 5, the base translation address 510, the potential translation modifiers for translation modifier table 516, and translated network address 520 are shown in hexadecimal format; however, these addresses and modifiers could be expressed in any suitable format. It should be understood that the particular values shown in and described with reference to FIG. 5 are provided as examples only. For example, the particular base translation address value, translation algorithm 514, values shown in translation modifier table 516 (as well as the particular number of potential translation modifiers), translation modifier 518, translated network address 520, and the like are provided as examples only.

FIG. 6 illustrates an example network address translation process 600, according to certain implementations. In certain implementations, some or all of the operations of network address translation process 600 may be executed by a NIC, such as NIC 110 of FIG. 1, NIC 210*a*/210*b* of FIG. 2, or NIC 300 of FIG. 3, as examples. For simplicity, this disclosure refers to network address translation process 600 as being performed by NIC 300 of FIG. 3.

In some implementations, network address translation process 600 is capable of translating Layer-3 addresses (e.g., IP addresses). Some uses of Layer-3 addresses are irregular such that no relationship between an IP address and a physical location of an application/process exists. In some implementations, such as some implementations of systems that include a large number of compute nodes, Layer-3 addressing may be regular to reduce network address translation costs and/or simplify use. Certain implementations of this disclosure may be extended to cover either case.

As described above, NIC 300 may receive a request (e.g., a request 313 of FIG. 3) for inter-process communication associated with a sending process of a distributed application, and that request may include or otherwise refer to a logical network address of a destination of the inter-process communication (e.g., a destination process of a destination compute node). NIC 300 may execute network address translation process 600 to translate the logical network address for a destination process (e.g., a logical Layer-3 address for a destination process) to a translated network address for the destination process (e.g., a physical Layer-3 address for the destination process or another logical Layer-3 address for the destination process). In some implementations, the logical network address may be an LNID. Network address translation process 600 has multiple phases, including a table lookup phase 602, an algorithm application phase 604, and a translated address determination phase 606, each of which are described below.

During table lookup phase 602, NIC 300 executes, using a first portion of the logical network address (e.g., first portion 402 of logical network address 400 of FIG. 4), a lookup of an NATT 608 to determine an L3 address generation rule 610. In the illustrated example, the determined L3 address generation rule 610 is IP_Entry=4. In certain implementations, the first portion of the logical network address includes an LNID of a compute node (e.g., a compute node 102, a compute node 202*a*/202*b*, etc.) on which the destination process is executing or otherwise located. For example, the high bits of the logical network address may be used by NIC 300 to select the L3 address generation rule 610.

FIG. 6 shows an example logical network address 609 that includes a first portion 611 and a second portion 613. Logical network address 609 may be an example of logical network address 400 shown in FIG. 4, first portion 611 and second portion 613 may correspond to first portion 402 and second portion 404, respectively. In the illustrated example of FIG. 6, logical network address 609 is shown to be 24 bits total, with first portion 611 shown to be an LNID of 11 bits and second portion 613 shown to be an offset of 13 bits. It should be understood that these particular bit-lengths (both the total bit-length of logical network address 609 and the respective lengths of first portion 611 and second portion 613) are for example purposes only. Logical network address 609 and first portion 611 and second portion 613 may have any suitable lengths.

NATT 608 may be an example of NATT 314 of FIG. 3. In certain implementations, NATT 608 includes multiple possible L3 address generation rules, as illustrated in the second column of NATT 608, indexed according to multiple logical network addresses (e.g., LNIDs, as illustrated in the first column of NATT 608). Additionally or alternatively, in certain implementations, the multiple possible L3 address generation rules (e.g., IP_Entries) of NATT 608 are indexed according to first portions of the multiple logical network address, and that first portion could represent logical endpoint addresses of the compute node on which the destination node is executing or otherwise located. The L3 address generation rules could be physical addresses or another intermediate logical address.

Such L3 address generation rules 610 may relate to whether IP version 4 (IPv4) or IPv6 is being used, whether a virtual local area network is being used, whether the networking environment is bridged, identification of a base MAC address and associated shift, and identification of an IP prefix and associated shift. In certain implementations, an L3 address generation rule 610 comprises a base translation address, such as a base MAC address (MAC_BASE) and/or a base IP address (IP_PREFIX).

In certain implementations, the structure of NATT 608 is programmed using a description of the IP addresses being used for particular compute nodes (e.g., compute nodes 102 of system 100 of FIG. 1). For example, NATT 608 may be programmed according to the use of IP addressing in the system (e.g., system 100 of FIG. 1) and the associated communication network (e.g., communication network 104 of FIG. 1), including the network locations of particular compute nodes (e.g., compute nodes 102 of system 100 of FIG. 1) or interfaces on a particular network that are engaging in inter-process communications.

A block 612 (as shown by the bolded rectangle surrounding selected entries of NATT 608) of those LNID-L3 address generation rule pairs may be assigned to the particular application and/or process associated with the inter-process communication/message. In the illustrated example, block 612 begins at NATT_Base entry and includes L entries (0 through L−1), with L representing an NATT_Count. Although shown to be contiguous within the illustrated example of NATT 608, in certain implementations block 612 of LNID-L3 address generation rule pairs assigned to the particular application and/or process associated with the inter-process communication/message could be non-contiguous within NATT 608. In certain implementations, the control plane state for the application associated with the request/message may specify the set of entries of NATT 608 (the block 612 of NATT 608) to be used for the particular application and/or process.

In some implementations, NIC 300 executes, using the first portion of the logical network address (e.g., first portion 402 of logical network address 400 of FIG. 4, such as first portion 611 of logical network address 609 of FIG. 6) of the request/message, a lookup of NATT 608 to determine an L3 address generation rule 610 at least in part by determining the first portion of the logical network address of the request/message and determining, from NATT 608, a particular L3 address generation rule indexed according to the first portion of the logical network address. NIC 300 may determine that the particular L3 address generation rule is L3 address generation rule for the logical network address that NIC 300 is translating. As described above, in certain implementation, the first portion of the logical network address (e.g., first portion 402 of logical network address 400 of FIG. 4, such as first portion 611 of logical network address 609 of FIG. 6) identifies a particular compute node (e.g., a particular compute node 102 of multiple compute nodes 102).

Table lookup phase 602 may avoid direct use of the first address (e.g., a base translation address, such as a logical address (e.g., for Layer-3)) by the requesting application/process, which instead uses the logical network address (e.g., logical network address 400 of FIG. 4, such as logical network address 609 of FIG. 6). The hardware (e.g., NIC 300) can be bound to perform the lookup within the block 612 of logical network addresses (e.g., IP entries) assigned to the requesting application/process (e.g., as defined in the appropriate control plane state) such that if NIC 300 attempts to perform a table lookup outside the assigned range, the lookup fails.

For example, in certain implementations, NIC 300 may determine, according to the logical network address of the request/message (e.g., according to the first portion of the logical network address), the block of NATT 608 entries that correspond to the request/message (e.g., block 612 in the illustrated example). To validate that the request/message is legitimate, NIC 300 may access the control plane state (e.g., of control plane states 310 of FIG. 3) for the application/process associated with the request/message to identify a block (which might or might not be block 612) of NATT 608 available/assigned to that application/process. If NIC 300 determines that the logical network address (e.g., the first portion of the logical network address) falls outside the block of NATT 608 entries (e.g., according to the logical network address index) available/assigned to the application/process associated with the request/message, then NIC 300 may reject the request/message and not perform the network address translation. If, on the other hand, NIC 300 determines that the logical network address (e.g., the first portion of the logical network address) is within the block of NATT 608 available/assigned to the application/process associated with the request/message, then NIC 300 may proceed with performing the network address translation. This disclosure contemplates omitting this validation and/or performing this validation in any suitable manner. In some implementations, this validation might be omitted on a per-application basis at the discretion of the control plane.

In the illustrated example of FIG. 6, NIC 300 determines, according to a control plane state for the application/process associated with the request/message, that block 612 of NATT 608 is a permissible block for the application/process that submitted the request/message. Additionally, in table lookup phase 602 and using a first portion of the logical network address of the request/message, NIC 300 identifies LNID 2 and accordingly determines that the L3 address generation rule for the logical network address of the request/message is IP_Entry=4.

Having determined L3 address generation rule 610 at table lookup phase 602, during algorithm application phase 604, NIC 300 uses a second portion of the logical network address (e.g., a second portion 404 of logical network address 400 of FIG. 4, such as second portion 613 of logical network address 609 of FIG. 6) of the received request/message to determine how destination MAC addresses and destination IP addresses are generated relative to a base translation MAC address (MAC_Base) and a base translation IP address (IP_Prefix). For example, NIC 300 may determine one or more translation modifiers by executing a translation algorithm 614 using a second portion of the logical network address (e.g., second portion 404 of logical network address 400 of FIG. 4, such as second portion 613 of logical network address 609 of FIG. 6) of the request/message. In certain implementations, the second portion of the logical network address comprises an offset. As described above, in certain implementation, the second portion of the logical network address (e.g., second portion 404 of logical network address 400 of FIG. 4, such as second portion 613 of logical network address 609 of FIG. 6) identifies an offset that can be used to determine a particular NIC on a compute node identified by the first portion of the logical network address (e.g., a particular NIC 110 on the particular compute node 102 of FIG. 1 identified by first portion 402 of logical network address 400 of FIG. 4, such as first portion 611 of logical network address 609 of FIG. 6) and a particular interface of the particular NIC (e.g., of interfaces 306 of NIC 300 of FIG. 3) on the compute node identified by the first portion of the logical network address. Translation algorithm 614 may be an example of translation algorithms 316 of FIG. 3.

Continuing with FIG. 6, a translation algorithm 614 (e.g., Algo[2]) may be designed to generate a particular number of possible translation modifiers, with the particular generated value for the translation modifier generated for a particular logical network identifier depending on the value of the second portion of the logical network identifier. In the illustrated example, as reflected by IP pattern table 616, translation algorithm 614 is designed to generate M possible translation modifiers. In the illustrated example, the value of M indicates greater than 7 possible translation modifiers.

In certain implementations, the translation modifier is an offset that can be added to the base translation address(es) (e.g., base MAC address and/or base IP address) of L3 address generation rule determined through table lookup phase 602 to determine the translation address for the logical network identifier associated with the request/message. In the illustrated example, executing translation algorithm 614 using the second portion of the logical network identifier results in NIC 300 determining translation modifier 618, which in this example is an offset value. For other logical network identifiers associated with other requests/messages, a different value for the second portion of the logical network identifier may result in NIC 300 determining a different translation modifier of the possible translation modifiers (e.g., of IP pattern table 616) when executing translation algorithm 614 using the second portion of the logical network identifier.

In certain implementations, translation algorithm 614 may include a set of shift, mask, and addition operations performed on a second portion of the logical network address (e.g., second portion 404 of logical network address 400 of FIG. 4, such as second portion 613 of logical network address 609 of FIG. 6). Additionally or alternatively, the second portion of the logical network address (e.g., second portion 404 of logical network address 400 of FIG. 4, such as second portion 613 of logical network address 609 of FIG. 6) may index into a table.

In certain implementations, multiple translation algorithms 614 may be available to NIC 300, and NIC 300 may select an appropriate translation algorithm 614 for a given network address translation process 600. For example, the multiple translation algorithms 614 may correspond to different manufacturers of compute nodes (e.g., compute nodes 102 of FIG. 1), and NIC 300 may be programmed to select the translation algorithm 614 for the types of compute nodes that are executing the distributed application. As another example, the multiple translation algorithms 614 may correspond to different types of compute nodes (e.g., compute nodes 102 of FIG. 1) with different numbers of NICs 300, from the same or different manufacturers, and NIC 300 may be programmed to select the translation algorithm 614 for the types of compute nodes (having the appropriate number of NICs 300) that are executing the distributed application. In certain implementations, NIC 300 may select the appropriate translation algorithm 614 according to information stored in the control plane state for the application/process associated with the request/message.

Having determined translation modifier 618 at algorithm application phase 604, during a translated address determination phase 606, NIC 300 determines the translated network address 620 using the one or more first addresses (e.g., base translation address(es) (e.g., base MAC address and/or base IP address) of L3 address generation rule 610) and the translation modifier (e.g., translation modifier 618). In certain implementations, translation modifier 618 is an offset and determining translated network address 620 using the first addresses and the translation modifier 618 includes summing the one or more first addresses and the translation modifier (e.g., translation modifier 618). Although not the case in the illustrated example, in certain implementations, the translated network address could be the one or more first addresses (e.g., the offset is zero according to translation algorithm 614.

In the illustrated example, a MAC address be generated as follows: MAC_Addr=MAC_Base+ (bridged? Offset<<MAC_shift). Thus, in certain implementations, the L3 address generation rule 610 determined from table lookup phase 602 specifies a MAC_Base as one base translation address, translation modifier 618 is an offset determined according to algorithm application phase 604, and the translated network address 620 is determined in part by summing the MAC_Base and the translation modifier 618 (the offset). If the network environment is bridged, this also may be factored into the adjustment. In the illustrated example, an IP address may be generated as follows: IP_Addr=IP_Prefix+ (Offset<<IP_shift). Thus, in certain implementations, the L3 address generation rule 610 determined from table lookup phase 602 specifies an IP_Prefix as one base translation address, translation modifier 618 is an offset determined according to algorithm application phase 604, and the translated network address 620 is determined in part by summing the IP_Prefix and the translation modifier 618 (the offset). The translated network address may include one or both of the determined MAC address (MAC_Addr) and IP address (IP_Addr). In certain implementations, the offset may be derived from the second portion of the logical network address (e.g., second portion 404 of logical network address 400, such as second portion 613 of logical network address 609 of FIG. 6). As described above, in certain implementations, the second portion of the logical network address may be the low bits of the logical network address. The translated network address may include one or both of the determined MAC address (MAC_Addr) and IP address (IP_Addr).

Network address translation process 600 may allow NATT 608 to have a reduced size or to support more users with a given size while still providing, through translation algorithm 614, a larger number of addresses than are included in NATT 608. For example, NATT 608 may include L possible base translation addresses allocated to multiple processes for executing the distributed application, the multiple processes including the sending process and the destination process. The L3 address generation rule 610, and the associated base translation address (e.g., the base MAC address (e.g., MAC_Base) and/or the base IP address (e.g., IP_Prefix)), may be one of the L possible L3 address generation rules. Continuing with this example, for each of the L possible L3 address generation rules, translation algorithm 614 might be used to determine up to M translation modifiers (and, correspondingly, M possible translated network addresses) such that an effective size of NATT 608 for the distributed application is L×M. M is the number of addresses that result from translation algorithm 614, and may be an integer greater than one. In certain implementations, the M possible translated network addresses are offset from the first address (e.g., the base translation address, such as the base MAC address and/or base IP address of an L3 address generation rule) by respective amounts determinable according to translation algorithm 614. In the illustrated example of FIG. 6, translation algorithm 614 multiplies size of NATT 608 by at least a factor of M (0 through M rows in IP pattern table 616), as translation algorithm produces M potential translation modifiers from one entry in NATT 608 (M being greater than 7 in this example). Assuming NATT 608 has a table size of N (e.g., N rows) and that the described network address translation technique applies to all N rows, an effective size of NATT 608 in total could be N×M.

Figure 7:
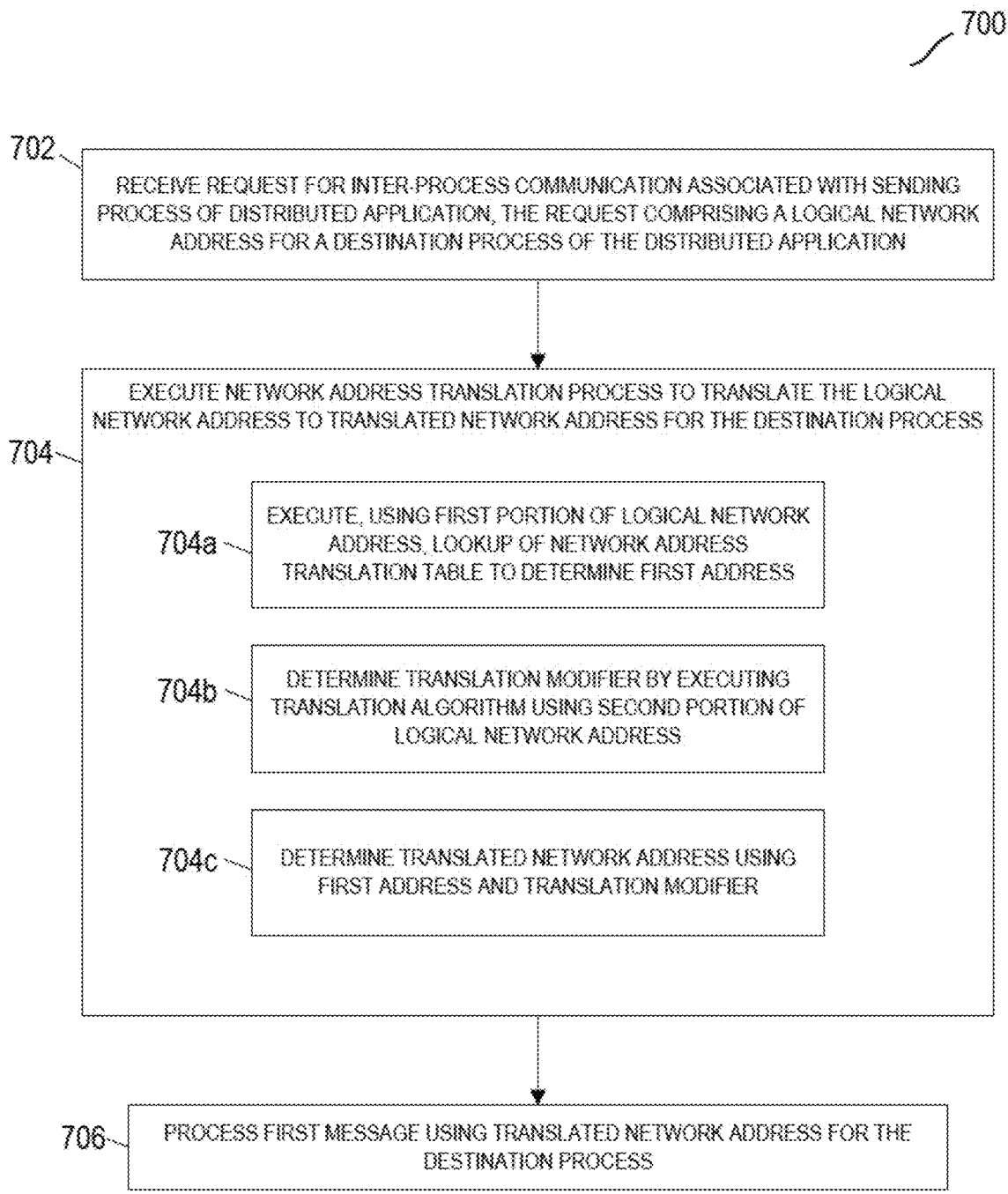
FIG. 7 illustrates an example method for network address translation, according to certain implementations.

FIG. 7 illustrates an example method 700 for network address translation, according to certain implementations. In certain implementations, some or all of the operations associated with method 700 are performed by a NIC, which could be NIC 110 of FIG. 1, NIC 210 of FIG. 2, NIC 300 of FIG. 3, or another suitable NIC. For simplicity, method 700 is described using NIC 300 of FIG. 3 as an example. In a particular example, method 700 relates to a process in which a compute node (e.g., a NIC 210*a* of compute node 202*a* of FIG. 2) receives a request to send a message (e.g., message 212(1)) to another compute node (e.g., a NIC 210*b* of compute node 202*b* of FIG. 2).

At step 702, NIC 300 receives a request for inter-process communication associated with a sending process of a distributed application. The request could be request 313 of FIG. 3, for example. The request may include a logical network address for a destination process of the distributed application. In certain implementations, the request is received from a user space of a compute node. In certain implementations, a first portion of the logical network address includes a logical endpoint address, and a second portion of the logical network address includes an identifier of a particular NIC of a plurality of NICs of a compute node associated with the destination process.

At step 704, NIC 300 executes a network address translation process to translate the logical network address for the destination process to a translated network address for the destination process. In certain implementations, the network address translation process includes steps 704*a*-704*c*.

At step 704*a*, NIC 300 executes, using a first portion of the logical network address, a lookup of a network address translation table to determine a first address (e.g., a base translation address). In certain implementations, the first portion of the logical network address includes a logical endpoint address.

In certain implementations, the network address translation table includes multiple possible first addresses (e.g., base translation addresses) indexed according to respective first portions of multiple logical network addresses (e.g., LNIDs). Executing, using the first portion of the logical network address, a lookup of the network address translation table to determine the first address (e.g., the base translation address for the logical network address of the request) may include determining the first portion of the logical network address of the request and determining, from the network address translation table, a particular first address (e.g., a particular base translation address) indexed according to the first portion of the logical network address of the request, the particular first address being the first address.

For example, in certain implementations, the network address translation table includes multiple possible first addresses (e.g., base translation addresses) indexed according to a plurality of logical endpoint addresses. Executing, using the first portion of the logical network address, a lookup of the network address translation table to determine the first address (e.g., the base translation address for the logical network address of the request) includes determining a particular logical endpoint address from the first portion of the logical network address and determining, from the network address translation table, a particular address (e.g., a particular base translation address) indexed by the particular logical endpoint address, the particular logical endpoint address being the first address.

At step 704b, NIC 300 determines a translation modifier by executing a translation algorithm using a second portion of the logical network address. In certain implementations, the second portion of the logical network address comprises a logical process identifier. In certain implementations, the second portion of the logical network address identifies a particular NIC (e.g., such as a particular NIC of multiple NICs) on a compute node.

At step 704c, NIC 300 determines the translated network address using the first address (e.g., the base translation address) and the translation modifier. In certain implementations, the translation modifier is an offset and determining the translated network address using the first address and the translation modifier includes summing the first address and the translation modifier. In certain implementations, the translated network address is the first address, such as when the translation modifier (e.g., an offset) has a value of zero.

In certain implementations, NIC 300 receives, from a management computer system, programming of the network address translation table and an indicator of the translation algorithm. This could be the case, for example, if the operating system is untrusted. In certain implementations, NIC 300 receives, from an operating system of a compute node coupled to the NIC, programming of the network address translation table and an indicator of the translation algorithm. This could be the case, for example, if the operating system is trusted.

In certain implementations, the first address is a Layer-2 physical base translation address and the translated network address is a Layer-2 physical addresses offset from the first address according to the translation modifier. In certain implementations, the first address is a Layer-3 base translation address and the translated network address is a Layer-3 address shifted from the Layer-3 base translation address according to the translation modifier.

In certain implementations, the sending process and the destination process are executing on a same compute node. The sending process and the destination process might be executing on different cores of the same compute node. In certain implementations, the sending process and the destination process are executing on different compute nodes.

At step 706, NIC 300 may process a message using the translated network address for the destination process. For example, NIC 300 may facilitate transmission of a message to a destination process via a communication network and using the translated network address for the destination process.

Figure 8:
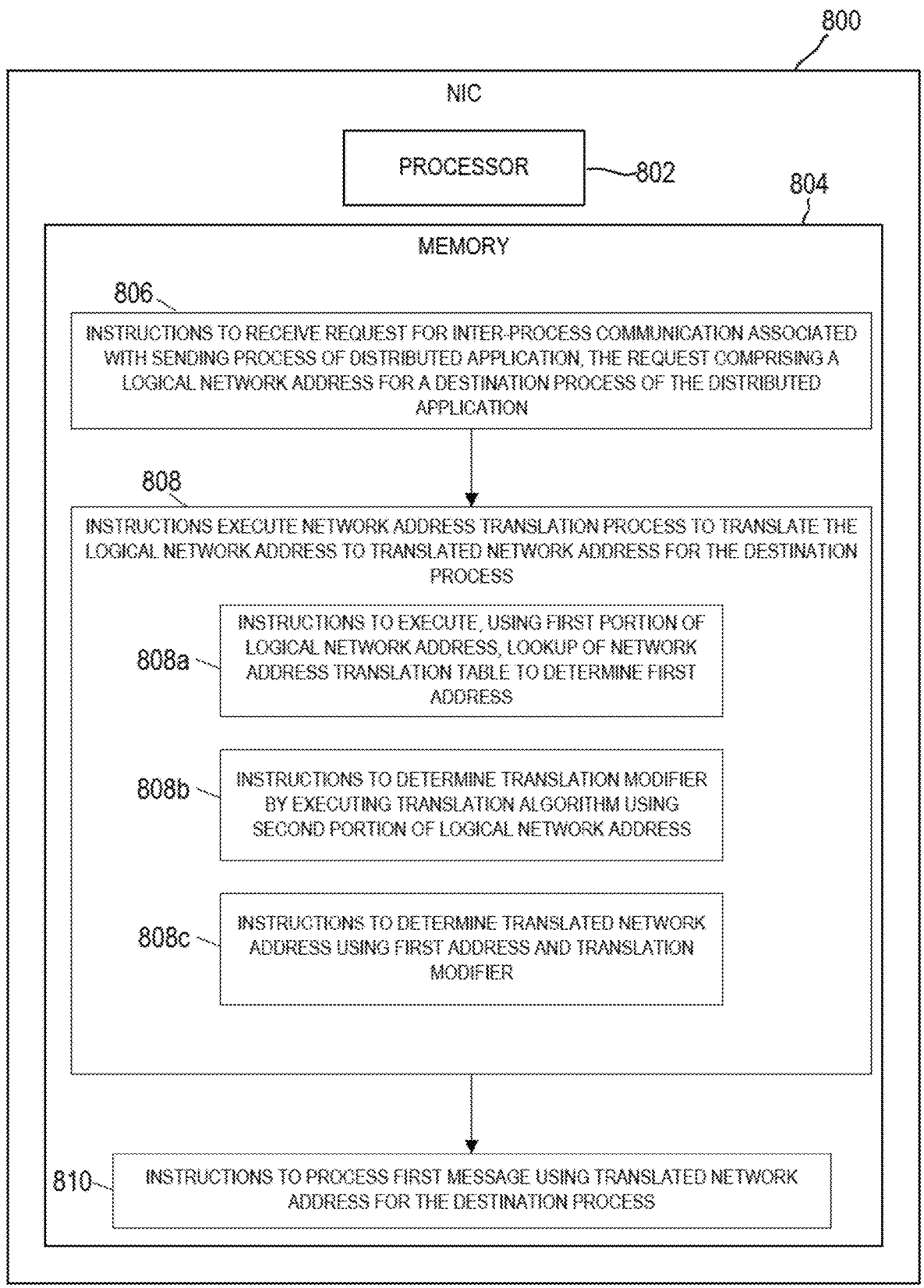
FIG. 8 illustrates a block diagram of an example NIC, according to certain implementations.

FIG. 8 is a block diagram of a NIC 800, according to certain implementations. NIC 800 is an example of NIC 300 previously described for FIG. 3. NIC 800 may include one or more processors 802 and memory 804. Memory 804 may include a non-transitory computer-readable medium that stores programming for execution by one or more of the one or more processors 802. In this implementation, one or more modules within NIC 800 may be partially or wholly embodied as software for performing any functionality described in this disclosure.

For example, memory 804 may include instructions 806 to receive a request for inter-process communication associated with a sending process of a distributed application. The request may include a logical network address for a destination process of the distributed application. Memory 804 may include instructions 808 to execute a network address translation process to translate the logical network address for the destination process to a translated network address for the destination process. In certain implementations, the instructions to execute the network address translation process include: instructions 808a to execute, using a first portion of the logical network address, a lookup of a network address translation table to determine a first address; instructions 808b to determine a translation modifier by executing a translation algorithm using a second portion of the logical network address; and instructions 808c to determine the translated network address using the first address and the translation modifier. Memory 804 may include instructions 810 to process a first message using the translated network address for the destination process.

Figure 9:
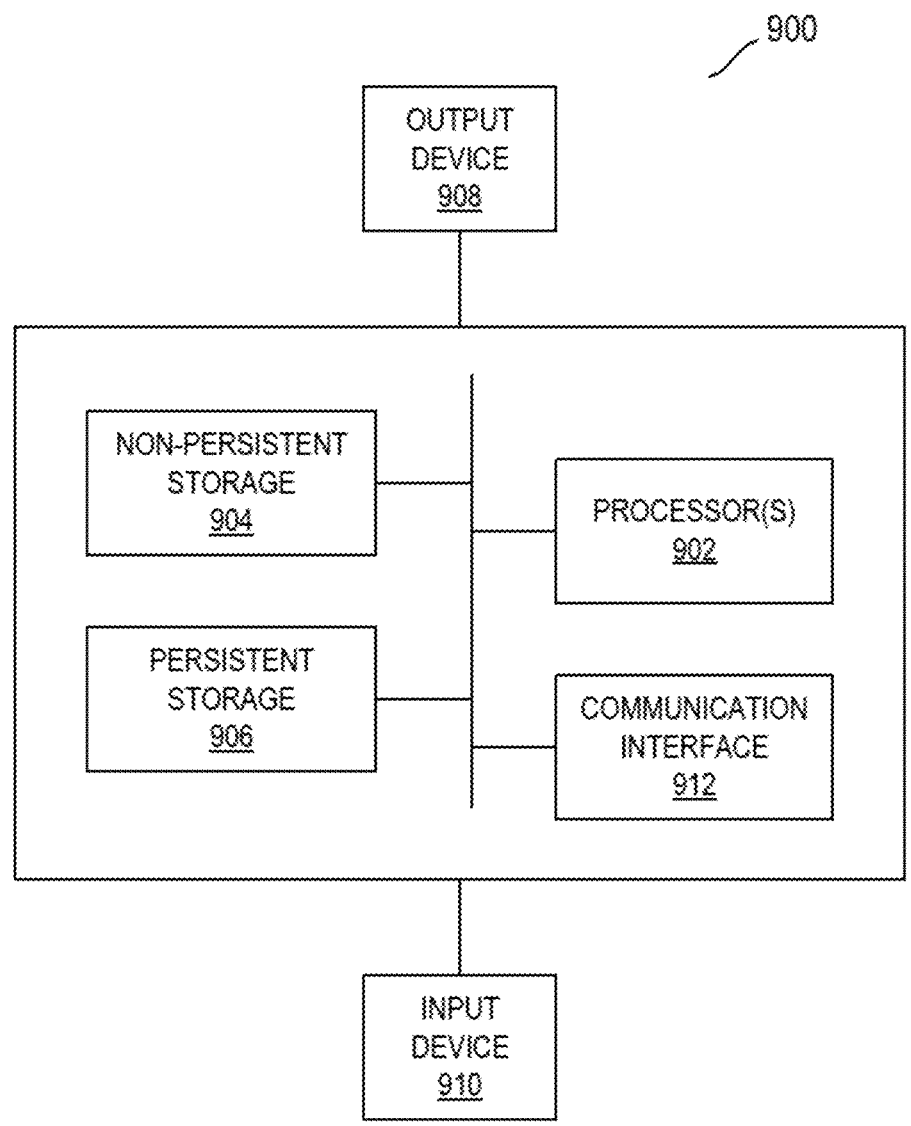
FIG. 9 illustrates a block diagram of an example computer system, according to certain implementations.

FIG. 9 illustrates a block diagram of an example computing device 900, according to certain implementations. As discussed above, implementations of this disclosure may be implemented using computing devices. For example, all or any portion of the components or methods shown in FIGS. 1-8 (e.g., system 100, compute nodes 102, compute nodes 202, NIC 300, processes 500 and 600, method 700, and NIC 800) may be implemented, at least in part, using one or more computing devices such as computing device 900.

Computing device 900 may include one or more computer processors 902, non-persistent storage 904 (e.g., volatile memory, such as random access memory (RAM), cache memory, etc.), persistent storage 906 (e.g., a hard disk, an optical drive such as a compact disk (CD) drive or digital versatile disk (DVD) drive, a flash memory, etc.), a communication interface 912 (e.g., Bluetooth interface, infrared interface, network interface, optical interface, etc.), input devices 910, output devices 908, and numerous other elements and functionalities. Each of these components is described below.

In certain implementations, computer processor(s) 902 may be an integrated circuit for processing instructions. For example, computer processor(s) may be one or more cores or micro-cores of a processor. Processor 902 may be a general-purpose processor configured to execute program code included in software executing on computing device 900. Processor 902 may be a special purpose processor where certain instructions are incorporated into the processor design. Although only one processor 902 is shown in FIG. 9, computing device 900 may include any number of processors.

Computing device 900 may also include one or more input devices 910, such as a touchscreen, keyboard, mouse, microphone, touchpad, electronic pen, motion sensor, or any other type of input device. Input devices 910 may allow a user to interact with computing device 900. In certain implementations, computing device 900 may include one or more output devices 908, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 902, non-persistent storage 904, and persistent storage 906. Many different types of computing devices exist, and the aforementioned input and output device(s)

may take other forms. In some instances, multimodal systems can allow a user to provide multiple types of input/output to communicate with computing device 900.

Further, communication interface 912 may facilitate connecting computing device 900 to a network (e.g., a LAN, WAN) such as the Internet, mobile network, or any other type of network) and/or to another device, such as another computing device. Communication interface 912 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a Bluetooth® Low Energy (BLE) wireless signal transfer, an IBEACON® wireless signal transfer, a radio frequency identifier (RFID) wireless signal transfer, near-field communications (NFC) wireless signal transfer, dedicated short range communication (DSRC) wireless signal transfer, 802.11 Wi-Fi wireless signal transfer, wireless LAN (WLAN) signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 912 may also include one or more Global Navigation Satellite System (GNSS) receivers or transceivers that are used to determine a location of the computing device 900 based on receipt of one or more signals from one or more satellites associated with one or more GNSS systems. GNSS systems include, but are not limited to, the US-based global positioning system (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 900 may be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Certain implementations may provide none, some, or all of the following technical advantages. These and other potential technical advantages may be described elsewhere in this disclosure, or may otherwise be readily apparent to those skilled in the art based on this disclosure.

Certain implementations reduce a size (or support more users with a given size) of a network address translation table stored on the NIC by allowing a table with N entries to be usable to determine N×M addresses, where N and M are positive integers that may have the same or different values. The product of N×M may have a value greater than N. In other words, N×M addresses may be represented by a table having only N entries. This may vastly extend table size (and hence the number of represented addresses) while minimizing storage associated with storing the table. For example, N may be the number of rows in the network address translation table assigned to a particular computing environment, with each row corresponding to a base translation address, and M may be the number of offsets/shifts that can be determined for each of those base translation addresses using the algorithm.

Certain implementations of this disclosure move a network address translation process from application software that may operate in a user space to hardware, such as from a user space to a NIC. Moving the network address translation process to hardware may provide one or more advantages. For example, moving the network address translation process to hardware may reduce a burden on the CPU (e.g., CPU loading in high message rate scenarios) to process network address translations, freeing the CPU to perform other tasks and thereby increasing performance. As another example, moving the network address translation process to hardware (e.g., to the control plane, which is a trusted area of the system that includes memory for NATTs) may increase security by reducing reliance on relatively insecure software (e.g., relative to hardware). As another example, performing a network address translation in hardware may reduce or eliminate cache misses that may be incurred when performing network address translation using software. Certain implementations make high speed networking more efficient and/or more secure. Certain implementations may be able to scale to any system size.

Certain implementations may be extended to cover both Layer-2 and Layer-3 addressing. Certain implementations are compatible with existing and future standard network application programming interfaces, such as libfabric, kfabric, Portals, and the UEC transport protocol, allowing the solution to be used with little or no changes in higher levels of software.

It should be understood that the systems and methods described in this disclosure may be combined in any suitable manner.

Furthermore, although generally described with reference to HPC systems, certain implementations of this disclosure may apply to any suitable type of computing system. For example, compute nodes may include any suitable type of computer systems, including computers for non-HPC applications. Thus, a computer system having multiple compute nodes might not implement an HPC configured with ultra-high performance compute nodes. Additionally, implementations of this disclosure may apply to general purposes computer systems (applicable to any of a variety of environments/use cases) and/or specific-purpose computer systems designed for highly specialized applications.

Example implementations of this disclosure are summarized here. Other implementations can also be understood from the entirety of the specification as well as the claims.

According to a first aspect, in certain implementations a method includes receiving, by a NIC, a request for inter-process communication associated with a sending process of a distributed application, the request including a logical network address for a destination process of the distributed application. The method includes executing, by the NIC, a network address translation process to translate the logical network address for the destination process to a translated network address for the destination process. The network address translation process includes executing, using a first portion of the logical network address, a lookup of a network address translation table to determine a first address; determining a translation modifier by executing a translation algorithm using a second portion of the logical network address; and determining the translated network address using the first address and the translation modifier. The method includes processing, by the NIC, a first message using the translated network address for the destination process.

In certain implementations of the first aspect, the network address translation table includes a plurality of possible first addresses indexed according to respective first portions of a plurality of logical network addresses; and executing, using the first portion of the logical network address, a lookup of the network address translation table to determine the first address includes: determining the first portion of the logical network address of the request; and determining, from the network address translation table, a particular first address indexed according to the first portion of the logical network address of the request, the particular first address being the first address.

In certain implementations of the first aspect, the translation modifier is an offset, and determining the translated network address using the first address and the translation modifier includes summing the first address and the translation modifier.

In certain implementations of the first aspect, the first portion of the logical network address includes a logical endpoint address, and the second portion of the logical network address includes an identifier of a particular NIC of a plurality of NICs of a compute node associated with the destination process.

In certain implementations of the first aspect, the first portion of the logical network address includes a logical endpoint address, and the second portion of the logical network address includes a logical process identifier.

In certain implementations of the first aspect, the network address translation table includes L possible first addresses allocated to a plurality of processes for executing the distributed application, the plurality of processes including the sending process and the destination process, the first address being one of the L possible first addresses. The translation algorithm can be used to determine up to M possible translated network addresses for each of the L possible first addresses such that an effective size of the network address translation table is L×M, the M possible translated network addresses being offset from the first address by respective amounts determinable according to the translation algorithm.

In certain implementations of the first aspect, the translated network address is the first address.

In certain implementations of the first aspect, the first address is a Layer-2 physical base translation address, and the translated network address is a Layer-2 physical addresses offset from the first address according to the translation modifier.

In certain implementations of the first aspect, the first address is a Layer-3 base translation address, and the translated network address is a Layer-3 address shifted from the Layer-3 base translation address according to the translation modifier.

In certain implementations of the first aspect, processing the first message includes initiating communication of the first message to the destination process using the translated network address.

In certain implementations of the first aspect, the sending process and the destination process are executing on a same compute node, or the sending process and the destination process are executing on different compute nodes.

In certain implementations of the first aspect, the request is received from a user space of a compute node.

According to a second aspect, in certain implementations a NIC includes one or more processors and one or more non-transitory computer-readable storage media storing programming for execution by the one or more processors. The programming includes instructions to receive a request for inter-process communication associated with a sending process of a distributed application, the request including a logical network address for a destination process of the distributed application. The programming includes instructions to execute a network address translation process to translate the logical network address for the destination process to a translated network address for the destination process. The network address translation process includes: executing, using a first portion of the logical network address, a lookup of a network address translation table to determine a first address; determining a translation modifier by executing a translation algorithm using a second portion of the logical network address; and determining the translated network address using the first address and the translation modifier. The programming includes instructions to process a first message using the translated network address for the destination process.

In certain implementations of the second aspect, the network address translation table includes a plurality of possible first addresses indexed according to respective first portions of a plurality of logical network addresses, and executing, using the first portion of the logical network address, a lookup of the network address translation table to determine the first address includes: determining the first portion of the logical network address of the request; and determining, from the network address translation table, a particular first address indexed according to the first portion of the logical network address of the request, the particular first address being the first address.

In certain implementations of the second aspect, the translation modifier is an offset, and determining the translated network address using the first address and the translation modifier includes summing the first address and the translation modifier.

In certain implementations of the second aspect, the first portion of the logical network address includes a logical endpoint address, and the second portion of the logical network address includes an identifier of a particular NIC of a plurality of NICs of a compute node associated with the destination process.

In certain implementations of the second aspect, the first portion of the logical network address includes a logical endpoint address, and the second portion of the logical network address includes a logical process identifier.

In certain implementations of the second aspect, the first address is a Layer-2 physical base translation address and the translated network address is a Layer-2 physical addresses offset from the first address according to the translation modifier.

In certain implementations of the second aspect, the first address is a Layer-3 base translation address and the translated network address is a Layer-3 address shifted from the Layer-3 base translation address according to the translation modifier.

In certain implementations of the second aspect, processing the first message includes initiating communication of the first message to the destination process using the translated network address.

According to a third aspect, in certain implementations one or more non-transitory computer-readable storage media store programming for execution by one or more processors. The programming includes instructions to receive a message associated with a sending process of a distributed application executing in a parallel computing environment, the message including a logical network address for a destination process of the distributed application. The programming includes instructions to execute a network address translation process to translate the logical network address for the destination process to a translated network address for the destination process. The network address translation process includes: executing, using a first portion of the logical network address, a network address table lookup to determine a first address; determining a translation modifier by executing a translation algorithm using a second portion of the logical network address; and determining the translated network address using the first address and the translation modifier. The programming includes instructions to process the message using the translated network address for the destination process.

In certain implementations of the third aspect, the instructions to process the message using the translated network address for the destination process include instructions to initiate delivery of the message to the destination process according to translated network address, the destination process located at a local host compute node.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A method, comprising:
receiving, by a network interface controller (NIC), a request for inter-process communication associated with a sending process of a distributed application, the request comprising a logical network address for a destination process of the distributed application;
executing, by the NIC, a network address translation process to translate the logical network address for the destination process to a translated network address for the destination process, the network address translation process comprising:
 executing, using a first portion of the logical network address, a lookup of a network address translation table to determine a first address;
 determining a translation modifier by executing a translation algorithm using a second portion of the logical network address; and
 determining the translated network address using the first address and the translation modifier; and
processing, by the NIC, a first message using the translated network address for the destination process.

2. The method of claim 1, wherein:
the network address translation table comprises a plurality of possible first addresses indexed according to respective first portions of a plurality of logical network addresses; and
executing, using the first portion of the logical network address, a lookup of the network address translation table to determine the first address comprises:
 determining the first portion of the logical network address of the request; and
 determining, from the network address translation table, a particular first address indexed according to the first portion of the logical network address of the request, the particular first address being the first address.

3. The method of claim 1, wherein:
the translation modifier is an offset; and
determining the translated network address using the first address and the translation modifier comprises summing the first address and the translation modifier.

4. The method of claim 1, wherein:
the first portion of the logical network address comprises a logical endpoint address; and
the second portion of the logical network address comprises an identifier of a particular NIC of a plurality of NICs of a compute node associated with the destination process.

5. The method of claim 1, wherein:
the network address translation table comprises L possible first addresses allocated to a plurality of processes for executing the distributed application, the plurality of processes comprising the sending process and the destination process, the first address being one of the L possible first addresses; and the translation algorithm can be used to determine up to M possible translated network addresses for each of the L possible first addresses such that an effective size of the network address translation table is L×M, the M possible translated network addresses being offset from the first address by respective amounts determinable according to the translation algorithm.

6. The method of claim 1, wherein the translated network address is the first address.

7. The method of claim 1, wherein the first address is a Layer-2 physical base translation address and the translated network address is a Layer-2 physical addresses offset from the first address according to the translation modifier.

8. The method of claim 1, wherein the first address is a Layer-3 base translation address and the translated network address is a Layer-3 address shifted from the Layer-3 base translation address according to the translation modifier.

9. The method of claim 1, wherein processing the first message comprises initiating communication of the first message to the destination process using the translated network address.

10. The method of claim 1, wherein:

the sending process and the destination process are executing on a same compute node; or the sending process and the destination process are executing on different compute nodes.

11. The method of claim 1, wherein the request is received from a user space of a compute node.

12. A network interface controller (NIC), comprising:

one or more processors; and one or more non-transitory computer-readable storage media storing programming for execution by the one or more processors, the programming comprising instructions to:

receive a request for inter-process communication associated with a sending process of a distributed application, the request comprising a logical network address for a destination process of the distributed application;

execute a network address translation process to translate the logical network address for the destination process to a translated network address for the destination process, the network address translation process comprising:

executing, using a first portion of the logical network address, a lookup of a network address translation table to determine a first address;

determining a translation modifier by executing a translation algorithm using a second portion of the logical network address; and determining the translated network address using the first address and the translation modifier; and process a first message using the translated network address for the destination process.

13. The NIC of claim 12, wherein:

the network address translation table comprises a plurality of possible first addresses indexed according to respective first portions of a plurality of logical network addresses; and executing, using the first portion of the logical network address, a lookup of the network address translation table to determine the first address comprises:

determining the first portion of the logical network address of the request; and determining, from the network address translation table, a particular first address indexed according to the first portion of the logical network address of the request, the particular first address being the first address.

14. The NIC of claim 12, wherein:

the translation modifier is an offset; and determining the translated network address using the first address and the translation modifier comprises summing the first address and the translation modifier.

15. The NIC of claim 12, wherein:

the first portion of the logical network address comprises a logical endpoint address; and the second portion of the logical network address comprises an identifier of a particular NIC of a plurality of NICs of a compute node associated with the destination process.

16. The NIC of claim 12, wherein the first address is a Layer-2 physical base translation address and the translated network address is a Layer-2 physical addresses offset from the first address according to the translation modifier.

17. The NIC of claim 12, wherein the first address is a Layer-3 base translation address and the translated network address is a Layer-3 address shifted from the Layer-3 base translation address according to the translation modifier.

18. The NIC of claim 12, wherein processing the first message comprises initiating communication of the first message to the destination process using the translated network address.

19. One or more non-transitory computer-readable storage media storing programming for execution by one or more processors, the programming comprising instructions to:

receive a message associated with a sending process of a distributed application executing in a parallel computing environment, the message comprising a logical network address for a destination process of the distributed application;

execute a network address translation process to translate the logical network address for the destination process to a translated network address for the destination process, the network address translation process comprising:

executing, using a first portion of the logical network address, a network address table lookup to determine a first address;

determining a translation modifier by executing an a translation algorithm using a second portion of the logical network address; and determining the translated network address using the first address and the translation modifier; and process the message using the translated network address for the destination process.

20. The one or more non-transitory computer-readable storage media of claim 19, wherein the instructions to process the message using the translated network address for the destination process comprise instructions to initiate delivery of the message to the destination process according to translated network address, the destination process located at a local host compute node.

* * * * *